(12) United States Patent
Lin

(10) Patent No.: US 8,744,249 B2
(45) Date of Patent: Jun. 3, 2014

(54) PICTURE SELECTION FOR VIDEO SKIMMING

(75) Inventor: Ken Kengkuan Lin, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 232 days.

(21) Appl. No.: 13/163,653

(22) Filed: Jun. 17, 2011

(65) Prior Publication Data

US 2012/0321280 A1 Dec. 20, 2012

(51) Int. Cl.
*H04N 5/93* (2006.01)
*H04N 5/917* (2006.01)
*H04N 21/43* (2011.01)

(52) U.S. Cl.
CPC ................. *H04N 21/43* (2013.01)
USPC ......................... 386/353; 386/355

(58) Field of Classification Search
None
See application file for complete search history.

(56) References Cited

U.S. PATENT DOCUMENTS

| | | | |
|---|---|---|---|
| 5,111,292 A | 5/1992 | Kuriacose et al. |
| 5,521,841 A | 5/1996 | Arman et al. |
| 5,659,539 A | 8/1997 | Porter et al. |
| 5,664,216 A | 9/1997 | Blumenau |
| 5,682,326 A | 10/1997 | Klingler et al. |
| 6,154,601 A | 11/2000 | Yaegashi |
| 6,204,840 B1 | 3/2001 | Petelycky et al. |
| 6,262,776 B1 | 7/2001 | Griffits |
| 6,392,710 B1 | 5/2002 | Gonsalves et al. |
| 6,542,692 B1 | 4/2003 | Houskeeper |
| 7,313,755 B2 | 12/2007 | Rahman et al. |
| 7,325,199 B1 | 1/2008 | Reid |
| 7,434,155 B2 | 10/2008 | Lee |
| 7,489,852 B2 * | 2/2009 | Onomatsu ............... 386/349 |
| 7,720,349 B2 | 5/2010 | Ogikubo |
| 7,809,802 B2 | 10/2010 | Lerman et al. |
| 2001/0020953 A1 | 9/2001 | Moriwake et al. |
| 2004/0001694 A1 | 1/2004 | Evans et al. |
| 2004/0088723 A1 | 5/2004 | Ma et al. |
| 2006/0156219 A1 | 7/2006 | Haot et al. |
| 2006/0236245 A1 | 10/2006 | Agarwal et al. |
| 2006/0245504 A1 * | 11/2006 | Ogikubo et al. ......... 375/240.25 |
| 2006/0291807 A1 | 12/2006 | Ryu et al. |
| 2008/0072166 A1 | 3/2008 | Reddy |
| 2009/0006475 A1 | 1/2009 | Udezue et al. |
| 2009/0024602 A1 | 1/2009 | Ohlfs |
| 2009/0172543 A1 | 7/2009 | Cronin et al. |
| 2010/0265347 A1 | 10/2010 | Agvard |
| 2010/0281367 A1 | 11/2010 | Langmacher et al. |

OTHER PUBLICATIONS

PCT/US2012/037851, May 14, 2012 (filed), Apple Inc.

(Continued)

*Primary Examiner* — William C Vaughn, Jr.
*Assistant Examiner* — Asher Khan
(74) *Attorney, Agent, or Firm* — Adeli LLP

(57) ABSTRACT

Some embodiments of the invention provide a video preview generator that quickly generates preview displays of different parts of a video. The preview generator includes a skimming tool and a picture generator. The skimming tool is moveable across a representation of a video clip in order to identify different video pictures within the video clip. As the skimming tool moves across the video clip representation, the picture generator identifies and displays different video pictures for different positions of the skimming tool on the video clip. For at least some of the positions of the skimming tool, the picture generator presents a video picture that is not at the location identified by the skimming tool, but rather is at a nearby location and is easier to present in the preview than the video picture at the identified location.

19 Claims, 16 Drawing Sheets

(56) References Cited

OTHER PUBLICATIONS

International Search Report and Written Opinion of PCT/US2012/037851, Aug. 9, 2012 (mailed), Apple Inc.

Author Unknown, "Apple Announces Final Cut Pro 4," NAB, Apr. 6, 2003, 3 pages, Apple Inc., Las Vegas, NV, USA.

Author Unknown, "iMovie '08 Getting Started," Month Unknown, 2008, pp. 1-50, Apple Inc., California, USA.

Author Unknown, "Using Adobe Premiere Elements 8 Editor," last updated Aug. 12, 2010, 313 pages, Adobe Systems Incorporated, San Jose, California, USA.

Author Unknown, "Apple Support Communities: Skimming," Apr. 19, 2011, Retrieved from the Internet: URL:https://discussions.apple.com/message/15025853#15025853 [retrieved on Apr. 16, 2008].

Author Unknown, "Adobe Premiere Pro CS3: User Guide," Apr. 1, 2008, 455 pages, Adobe Systems Incorporated, San Jose, California, USA.

Brenneis, Lisa, "Final Cut Pro 3 for Macinotsh: Visual QuickPro Guide," Apr. 2002, 288 pages, Peachpit Press, Berkeley, California, USA.

Casares, Juan, et al., "Simplifying Video Editing Using Metadata," Proceedings of Designing Interactive Systems (DIS 2002), Jun. 2002, pp. 157-166, London, Great Britain.

O'Brien, Ken, "Learn iMovie '11—How to Use the Skim Feature," Mahalo.com Inc., Feb. 25, 2011, Retrieved from the Internet: URL:http://www.youtube.com/watch?v=Qjpap2U2Rzk [retrieved on Aug. 1, 2012].

Wang, Yijin, et al. "My Videos—A System for Home Video Management", Proceedings of the 10th ACM International Conference on Multimedia, Dec. 1-6, 2002, pp. 412-413, Juan-les-Pins, France.

Benini, Sergio, et al., "Hidden Markov Models for Video Skim Generation," Eighth International Workshop on Image Analysis for Multimedia Interactive Services 2007, Month Unknown 2007, IEEE.

Huang, Yu, "Adaptive Nonlinear Video Editing: Retargeting, Replaying, Repainting and Reusing ($R^4$)," Multimedia Content Networking Lab TR-2009-1, Apr. 2009.

Meng, Jianhao, et al., "Tools for Compressed-Domain Video Indexing and Editing," Proceedings of SPIE Conference on Storage and Retrieval for Image and Video Database, Feb. 1996, vol. 2670, San Jose, CA.

Yoneyama, Akio, et al., "A Fast Frame-Accurate H.264/MPEG-4 AVC Editing Method," Proceedings of International Conference on Multimedia and Expo 2005, Jul. 6, 2005, IEEE.

* cited by examiner

PICTURE SELECTION FOR VIDEO SKIMMING

BACKGROUND

Digital graphic design, image editing, audio editing, and video editing applications (hereafter collectively referred to as media content editing applications or media-editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media-editing applications facilitate such composition through electronic means. Specifically, a computer or other electronic device with a processor and computer readable storage medium executes the media-editing application. In so doing, the computer generates a graphical interface that allows designers to digitally manipulate graphical representations of the media content to produce a desired result. However, in many cases, the designers experience inconvenience in manipulating graphical representations of the media content because of the shortcomings of the existing applications. For example, when a user quickly skims through a video clip by moving a skimming tool across a representation of the video clip, the user may experience delay in viewing the pictures from the video clip as some pictures in the video clip take longer time to decode and display than others.

BRIEF SUMMARY

Some embodiments of the invention provide a novel video preview generator that quickly generates preview displays of different parts of a video on a device. In some embodiments, the preview generator includes a skimming tool (e.g., a playhead) and a picture generator. The skimming tool in these embodiments is moveable across a representation of a video clip on the device in order to identify different video pictures (e.g., different fields or frames) within the video clip. As the skimming tool moves across the video clip representation (also called video clip icon below), the picture generator identifies and presents different video pictures to display in the preview for different positions of the skimming tool on the video clip. For at least some of the positions of the skimming tool, the picture generator presents a video picture that is not in the video clip at the location identified by the skimming tool, but rather is at a nearby location and is easier to present in the preview than the video picture at the identified location.

In some embodiments, the video picture that is easier to display is the video picture that is easiest to decode. Specifically, in these embodiments, the video clip is stored on the device in an encoded manner. When the skimming tool moves to a location on the video clip icon that is associated with a video picture that the device has decoded and stored, the picture generator presents the decoded version of the video picture. However, when the skimming tool moves to a particular location that is associated with a particular video picture for which the device does not have a stored, decoded version, the picture generator identifies a nearby video picture that is easier to decode than the particular video picture and the other nearby video pictures. After the skimming tool has stayed at the particular location for a duration of time, the picture generator in some embodiments decodes the particular video picture and presents this decoded picture in its preview display.

In some embodiments, the easiest video picture to decode is the video picture that is fastest to decode in a set of video pictures that are nearby the particular video picture. For instance, in some embodiments, the nearby video pictures are the video pictures that are within the same encoding group of pictures (i.e., same encoding GOP) as the particular video picture. In other embodiments, the nearby video pictures are not necessarily in the same encoding GOP as the particular video picture, but are video pictures between the video picture associated with the previous location of the skimming tool and the particular video picture associated with the current location of the skimming tool. Accordingly, in these embodiments, the video picture selected as the easiest video picture to decode may be part of the same encoding GOP as the particular video picture or part of an encoding GOP that is before (or after depending on the direction of the movement of the skimming tool) the encoding GOP of the particular video picture.

The picture generator in some of these embodiments identifies a nearby video picture for display based on the number of reference video pictures that are directly or indirectly referenced by the video picture. Therefore, for each of the nearby pictures, the picture generator in some embodiments computes a number of reference pictures that are directly or indirectly referenced by the picture based on an assumption that the number of reference pictures serves as a good estimate of decoding time. After computing the number of reference pictures for each of the several nearby pictures, the picture generator selects the picture that has the smallest computed number of reference pictures. When multiple pictures have the same computed number of reference pictures, the picture generator selects the picture that is closest to the particular picture in a display order.

Other embodiments, however, use other techniques to identify the easiest nearby video picture to present or the fastest nearby video picture to decode. For instance, in other embodiments, the picture generator computes a metric score that estimates the decoding time for each video picture based on the size of the particular picture, the size of the reference pictures referenced by the particular picture, and the number of reference pictures directly or indirectly referenced by the particular picture. Based on the computed metric scores, the picture generator then selects the nearby video picture to decode and present in the preview display for a particular location of the skimming tool that does not have a decoded video picture.

Also, in many examples described above and below, the skimming tool is said to move from left to right along a timeline that spans from left to right (i.e., to move from an earlier point in time to a later point in time). Accordingly, some of the discussions above and below are about selecting a nearby picture from a set of pictures that are all or mostly before the current picture at the current location of the playhead. The use of this terminology, however, should not imply that the selection of the group or picture is always made from the pictures that precede the current location of the skimming tool. This is because, in instances when the skimming tool (e.g., playhead) moves from right to left along a timeline that spans from left to right (i.e., moves back in time), the preview generator of some embodiments identifies nearby pictures that are after the current location of the skimming tool (i.e., that are to the right of the current location) or that are mostly after the current location.

Accordingly, the preview generator of some embodiments can select the nearby group of pictures and a picture in the nearby group of pictures from pictures before or after the current location of the skimming tool depending on the direction of movement of the skimming tool. In other words, when a skimming tool moves from a first location to a second current location in a particular direction (e.g., from right to left along a timeline that spans from left to right), the skimming tool selects a nearby group of pictures that include only or mostly pictures that are between the pictures associated with the first and second locations. This is because these in-between pictures are the pictures over which the skimming tool has conceptually moved, which makes one of them a more acceptable choice as a temporary substitute picture for the current picture at the second current location of the skimming tool than the picture at the first location of the tool or a picture beyond the second location of the tool. However, as further described below, some embodiments do allow selection of intra-encoded picture that is beyond the second current location of the tool in some situations when the movement of the tool spans multiple encoding GOPs.

Different applications use the preview generator of some embodiments of the invention. For instance, the preview generator of some embodiments is used in a media-editing application that composites one or more media clips to create a composite media presentation. In these embodiments, the preview generator can be used to generate previews of video clips that are part of a composite presentation, or that are candidates for adding to the composite presentation. In other embodiments, the preview generator is used by the operating system of the device in order to generate quick previews of video clips stored on the device.

Also, while some embodiments described above and below are for generating previews of a video clip, one of ordinary skill in the art will realize that the invention can be used to generate quick previews of other sets of associated pictures, such as slide shows, etc. Accordingly, the preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
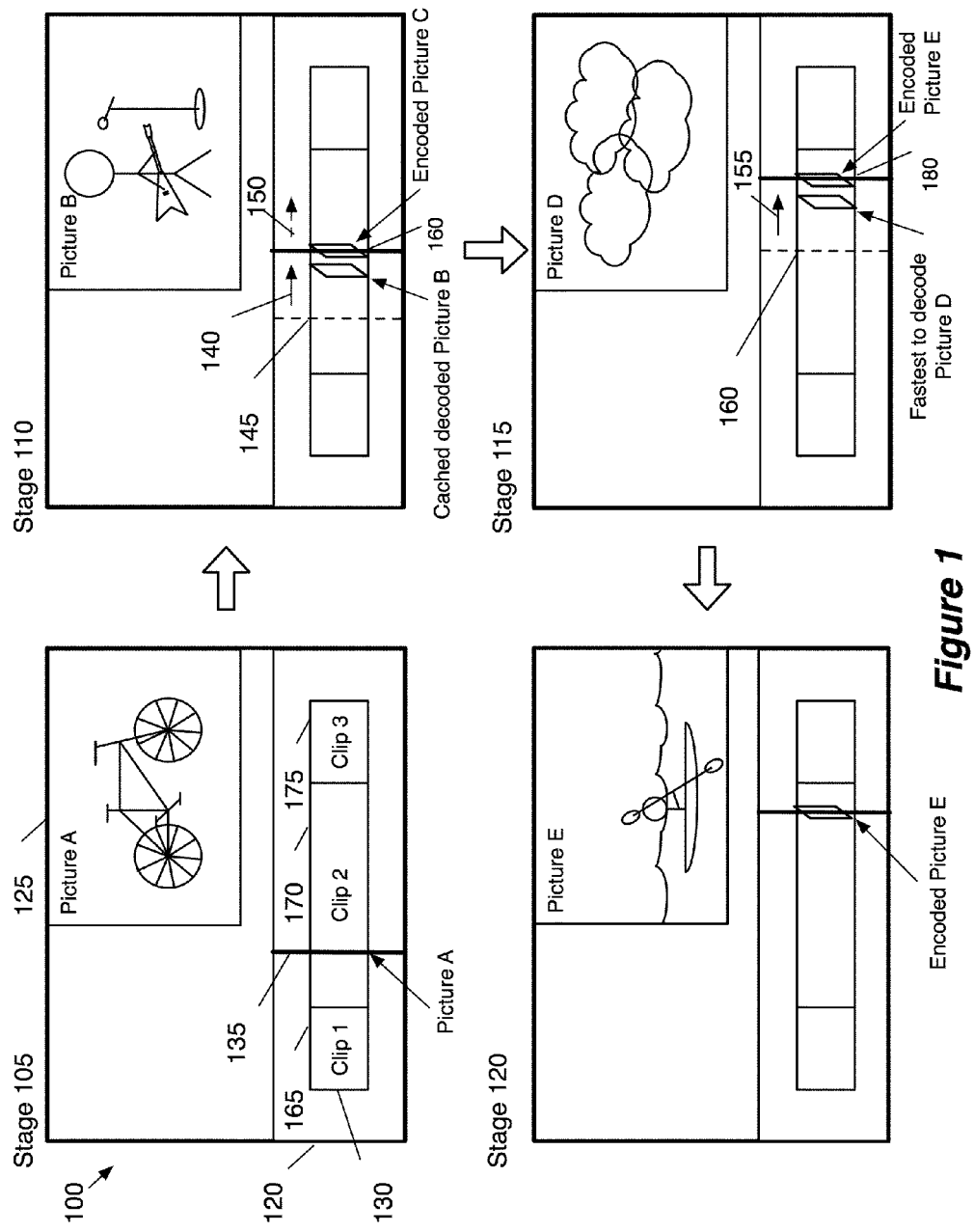
FIG. 1 illustrates an example of generating a preview when a user skims through a video clip.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel video preview generator that quickly generates preview displays of different parts of a video on a device. In some embodiments, the preview generator includes a skimming tool (e.g., a playhead) and a picture generator. The skimming tool in these embodiments is moveable across a representation of a video clip on the device in order to identify different video pictures (e.g., different fields or frames) within the video clip. As the skimming tool moves across the video clip representation (also called video clip icon), the picture generator identifies and presents different video pictures to display in the preview for different positions of the skimming tool on the video clip. For at least some of the positions of the skimming tool, the picture generator presents a video picture that is not in the video clip at the location identified by the skimming tool, but rather is at a nearby location and is easier to present in the preview than the video picture at the identified location.

In some embodiments, the video clip is stored on the device in an encoded manner and its pictures are required to be decoded before being presented in the preview. In these embodiments, the video picture that is easier to display is the video picture that is easiest or fastest to decode. When the skimming tool moves to a location on the video clip icon that is associated with a video picture that the device has decoded and stored, the picture generator presents the decoded version of the video picture. However, when the skimming tool moves to a particular location that is associated with a particular video picture for which the device does not have a stored, decoded version, the picture generator identifies a nearby video picture that is easier to decode than the particular video picture and the other nearby video pictures. After the skimming tool has stayed at the particular location for a duration of time, the picture generator in some embodiments decodes the particular video picture and presents this decoded picture in its preview display.

Different applications use the preview generator of some embodiments of the invention. For instance, as further described below by reference to FIG. 14, the preview generator of some embodiments is used by the operating system of the device in order to generate quick previews of video clips stored on the device. Alternatively, the preview generator of other embodiments is used in a media-editing application that composites one or more media clips to create a composite media presentation. In these embodiments, the preview generator can be used to generate previews of video clips that are part of a composite presentation, or that are candidates for adding to the composite presentation.

FIG. 1 illustrates a GUI 100 of a media-editing application with such a preview generator. Specifically, this figure illustrates the GUI 100 at four different stages 105, 110, 115, and 120 that show the preview generator providing a preview of several videos in a composite presentation. Each of these stages will be described in more detail below after an introduction of the elements of GUI 100.

As shown in FIG. 1, the GUI 100 includes a composite display area 120 (also called a timeline below) and a preview display area 125. The composite display area 120 includes a video track and displays a graphical representation of the composite presentation by displaying media clips that form the composite presentation. Although the composite display area 120 in this example only shows one media track, other embodiments may include more than one track. For instance, in some embodiments, the composite display area may also include one or more audio tracks, transition tracks, additional video tracks, etc. In other embodiments, the composite display area does not include multiple tracks, but rather includes a single track (called a spine) to which other clips or sequences of clips connect (also called anchor). For these embodiments, the video track 130 represents the spine.

As shown, the video track 130 in this figure includes three video clip icons representing three video clips 165, 170, and 175. In some embodiments, the media-editing application associates different horizontal locations on each video clip icon with a video picture (e.g., field or frame) of the corresponding video clip. The composite display area also includes a playhead 135 that is movable across the video clip icons.

In some embodiments, the preview display area 125 displays a preview of the media presentation (e.g., video presentation) that is composited in the composite display area 120. As the playhead moves across the timeline and scrolls over each video clip in the timeline, the preview display area displays a video clip picture that corresponds to the location of the playhead 135. Thus, as the playhead 135 moves from one location to another on a video clip icon, different pictures of the video clip represented by the different locations of the playhead 135 on the video clip icon are displayed in the preview display area 125.

Different embodiments provide different techniques for moving the playhead 135 across the timeline. For instance, in some embodiments, the playhead 135 can move across the timeline during a playback of the composite presentation, or as a result of its manual movement by a user. In some embodiments, the playhead 135 manually moves across the timeline in response to a user's selection of the playhead (e.g., through a cursor selection or a touch-screen selection of the playhead) and movement of the selected playhead across the timeline. In other embodiments, the user does not need to select the playhead, as the playhead 135 manually moves across the timeline as the user moves the cursor or touch-screen contact across the timeline.

When the user manually moves the playhead across the timeline, the playhead 135 serves as a skimming tool that allows a user to skim through the content of the video clips in the composite presentation. Different embodiments use different graphical representations for the playhead as the skimming tool. In the example illustrated in FIG. 1, the playhead 135 appears as a vertical line that spans the entire height of the composite display area 120. The playhead 135 along with a picture generator (not shown) forms the preview generator of the media-editing application 100 of some embodiments.

The operation of the GUI 100 will now be described by reference to the state of this GUI during the four stages 105, 110, 115, and 120. The first stage 105 shows an initial state of the GUI. In this initial state, the three video clips 165, 170, and 175 are on video track 130. The playhead 135 is idle at a location over the second clip 170. This location corresponds to Picture A ("the current picture") of the second video clip 170. For this position, the application's picture generator has decoded and displayed Picture A as the playhead 135 has been at this idle position for a sufficiently long duration of time.

The second stage 110 illustrates the GUI 100 after the user has started skimming through the content of the video clip 170 by moving the playhead 135 forward on the video track 130. In this stage, the solid line 160 indicates the current location of the playhead, the dotted line 145 indicates the playhead's previous location, the solid arrow 140 indicates the movement of the playhead from location 145 to location 160, and the dotted arrow 150 indicates the playhead's continuing movement to the right on the video track 130. The user's movement of the playhead 135 in this example may be accomplished through any one of several techniques, such as through cursor control operations (e.g., through a click and drag operation), through touch screen control operations (e.g., through touch screen contact and movement on a touch screen display of the device), etc.

As shown in the second stage 110, the playhead 135 has moved from the previous location 145 over the second video clip 170 to the current location 160 over this video clip. This location corresponds to the second clip's encoded Picture C, which is now the current picture. Since the current picture is not decoded and stored, the picture generator selects a nearby picture that is fastest to decode. In some embodiments, the nearby video pictures for a current location of the playhead are the video pictures that are within the same encoding group of pictures (i.e., same encoding GOP) as the current picture associated with the current location of the playhead. An encoding GOP is a group of successive pictures within an encoded video stream that beings with an intra-picture (i.e., a picture that does not reference any other picture) and ends with the picture before the next intra-picture. In other embodiments, the nearby video pictures are not necessarily in the same encoding GOP as the current picture, but are video pictures between the video picture associated with the previous location 145 of the playhead and the current picture (Picture C) associated with the current location 160 of the playhead. Accordingly, in these embodiments, the video picture selected as the easiest video picture to decode may be part of the same encoding GOP as the current picture or part of the encoding GOP that is before (or after depending on the direction of the movement of the playhead) the encoding GOP of the current picture.

In the example illustrated in FIG. 1, the picture generator of the media-editing application identifies the nearby group of pictures as simply the group of pictures that includes pictures between Picture A (i.e., the picture associated with the previous location 145 of the playhead 135) and Picture C (i.e., the current picture associated with the current location 160 of the playhead 135). As shown in this figure, this group includes decoded Picture B. For the playhead location 160, the second stage 110 shows that the picture generator has selected and displayed decoded Picture B because this picture was the closest picture in the group of pictures associated with Picture C that did not require any decoding.

The third stage 115 illustrates the GUI 100 after the user has further moved the playhead 135 to the right (e.g., through a click-and-drag operation, through a touch screen contact and movement, etc.) from the previous location 160 over the second video clip 170 to the current location 180 over this video clip, as indicated by the solid arrow 155. This stage 115 also illustrates that the playhead has stopped at the position 180. It further illustrates that the current location 180 corresponds to the second-clip encoded Picture E, which is now the current picture.

Since this current picture is not decoded and stored, the application's picture generator identifies a group of nearby pictures for this playhead location and selects a nearby picture that is fastest to decode. Again, in this example, the picture generator identifies the group of nearby pictures as pictures between the picture (Picture C) associated with the previous playhead location 160 and the current picture (Picture E) associated with the current playhead location 180. As shown, the group of nearby pictures includes Picture D. Accordingly, for the playhead location 180, the picture generator decodes and displays Picture D as the picture generator determines that Picture D is fastest to decode within the identified group of nearby pictures.

The fourth stage 120 illustrates the GUI 100 after the playhead 135 is idle for a duration of time at the playhead location 180. In some embodiments, when the playhead has stayed at a particular location for a certain duration of time (e.g., 30-60 milliseconds), and the particular location is associated with a current picture that has not yet been decoded, the picture generator decodes the current picture (i.e., the video picture of the video clip identified by the skimming tool) and presents the current picture in the preview display area 125. Accordingly, given that the Picture E was not decoded when the playhead reached location 180 during the third stage, the fourth stage 120 illustrates that the application's picture generator has decoded Picture E as the playhead 135 was idle at this position for a sufficiently long duration of time, and has displayed this decoded picture in the preview display 125.

FIG. 1 illustrates the movement of the playhead from a first location to a second location across the timeline. It should be noted that the two locations are shown significantly apart in this figure in order to simplify the description of some embodiments of the invention. In reality, the two locations may be much closer than they appear in this figure as the picture selection operation described above is repeatedly and rapidly performed for many such location pairs while the playhead is being moved in some embodiments.

Figure 2:
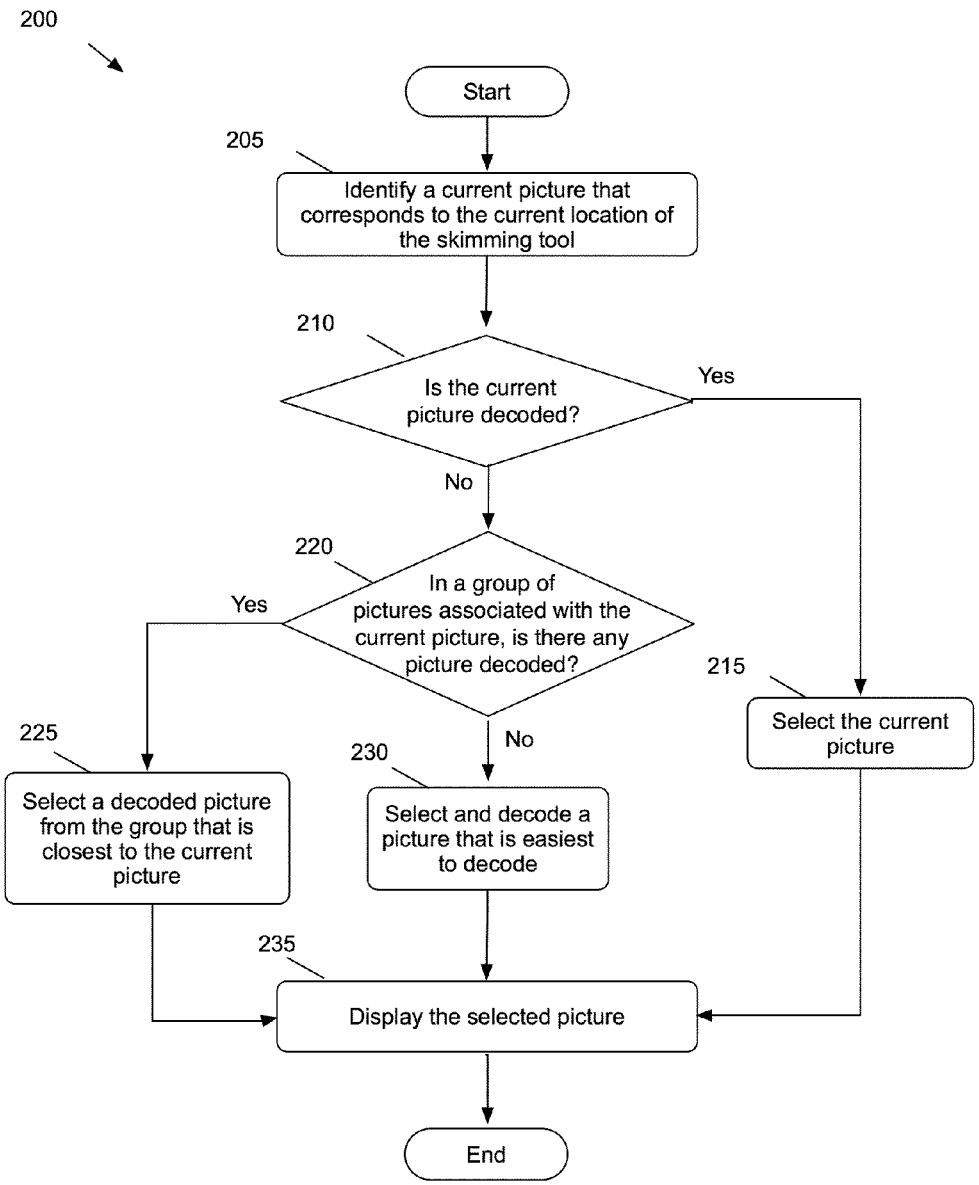
FIG. 2 illustrates a process of some embodiments for generating a preview when a user skims through a video clip.

FIG. 2 conceptually illustrates a process 200 that the application's picture generator performs in some embodiments to select and display a video picture after movement of the playhead from a first location to a second location in the timeline. Some embodiments perform this process upon receiving notification of the movement of the playhead between the first and second locations. For instance, the picture generator performs this process several times as the playhead moves between locations 145 to 160, and then between locations 160 to 180 in the example illustrated in FIG. 1.

As shown in FIG. 2, the process 200 begins by identifying (at 205) a current video picture that corresponds to the current location of the playhead on the video clip icon. Next, the process determines (at 210) whether the identified current picture has been decoded and stored in a cache storage of the application. In some embodiments, the cache storage is memory space allocated for the application in the device's volatile memory (e.g., RAM) and/or its non-volatile memory (e.g., disk, flash memory, etc.). The amount of allocated memory is often finite, which in some embodiments requires purging of decoded pictures from the allocated memory whenever the application usage of this memory reaches its limits.

When the process determines (at 210) that the current picture is decoded and stored in the cache, the process selects (at 215) the identified current picture. The process then displays (at 235) the selected picture. On the other hand, when the process determines (at 210) that the current picture is not currently stored in the cache in a decoded manner, the process determines (at 220) whether there are any decoded pictures in a group of nearby pictures associated with the current picture. As mentioned above, the group of pictures in some embodiments is an encoding group of pictures (i.e., is an encoding GOP), while in other embodiments, it is not an encoding group but rather is simply a set of pictures between the picture associated with the previous position of the playhead (i.e., with the playhead's first location) and the picture associated with its current position (i.e., with the playhead's second location).

When the process determines (at 220) that there is one or more cached decoded video pictures within the group of nearby pictures, the process selects (at 225) a decoded picture that is located closest to the current picture in the group of pictures associated with the current picture. For example, in the second stage 110 of FIG. 1, Picture B is selected because Picture B has been decoded and stored in a cache. The process then displays (at 235) the selected picture.

When the process determines (at 220) that there is no decoded video picture within the group, the process selects and decodes (at 230) a video picture within the group that is fastest to decode. In the third stage 115 of FIG. 1, Picture D is selected from the group of nearby pictures because Picture D is fastest to decode. The operation of selecting a picture that is fastest to decode within the group of nearby pictures will be explained in more detail below by reference to FIGS. 3 and 4. After selecting the picture (at 230), the process displays (at 235) the selected picture. After 235, the process ends.

Figure 3:
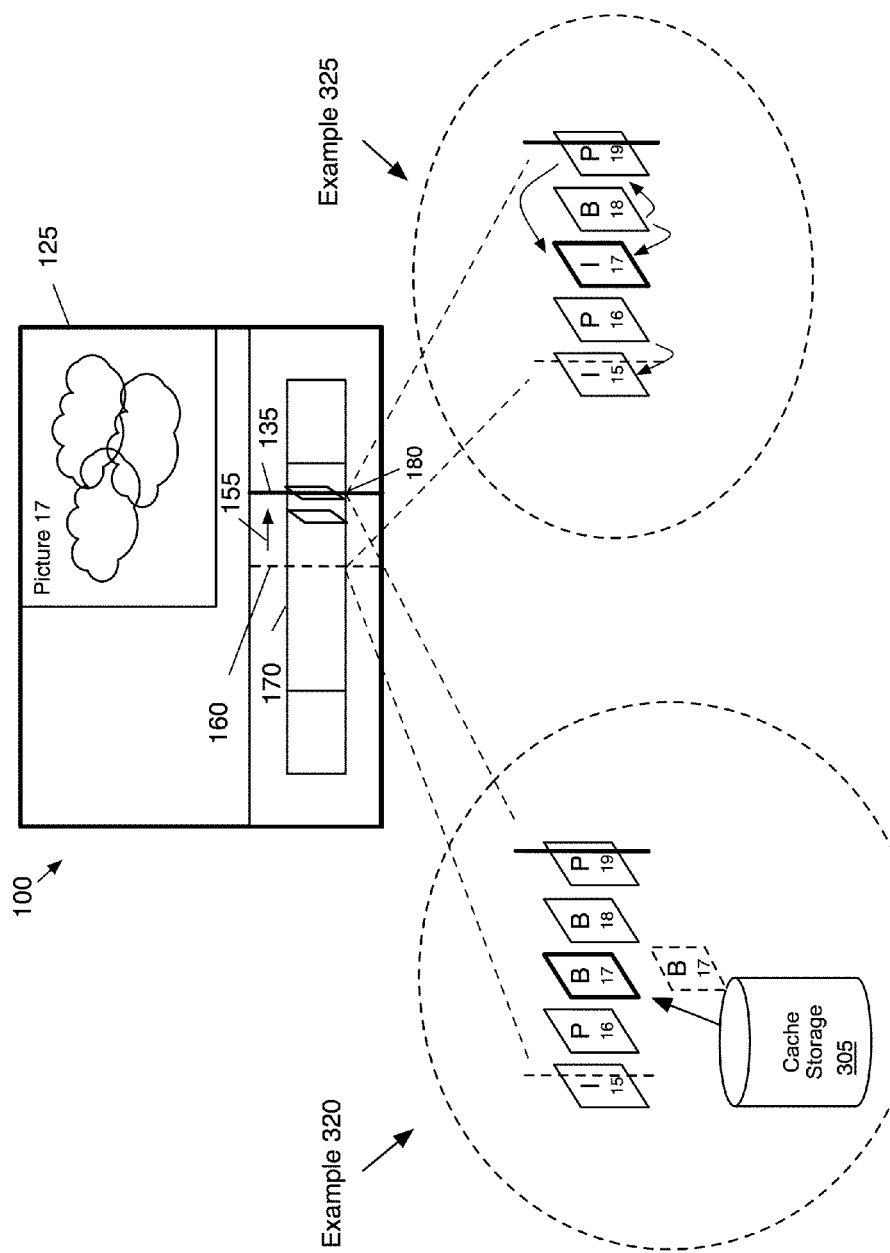
FIG. 3 illustrates several examples of selecting pictures for a video preview when a user skims through a video clip.

FIG. 3 illustrates two examples of selecting a video picture for display during a skimming operation that use the process 200 of FIG. 2. FIG. 3 illustrates these two examples by illustrating the third stage 115 of FIG. 1, which shows the playhead 135 moving from the previous location 160 to the current location 180 over the second video clip 170. The current location 180 corresponds to second-clip encoded Picture 19, which serves as the current picture. Since Picture 19 has not been decoded, the picture generator has to select a picture to display in lieu of Picture 19 from a group of nearby pictures that are associated with the current picture.

The two examples illustrated in FIG. 3 present two variations of what the nearby group of pictures could include. In both of these examples, the group of nearby pictures are pictures that are located between the picture associated with the previous location 160 of the playhead and the current picture associated with the current location 180 of the playhead 135. Also, in both of the examples, the pictures have been encoded using MPEG2 and the group of pictures includes four pictures 16 to 19.

In the first example 320, Picture 15 is an I-picture (also known as an intra-picture) that does not reference any other picture. Picture 16 is a P-picture. Picture 17 is a B-picture. Picture 18 is a B-picture. Picture 19 is a P-picture. In this sequence, B-picture 17 has been previously decoded and stored in a cache storage 305 of the application, while B-picture 18 has not been decoded and stored in this storage. Accordingly, when the playhead 135 reaches the location 180 that corresponds to the encoded Picture 19 in this example, the picture generator identifies Picture 17 as the picture that is closest to the current picture that is stored in a decoded state in the cache storage 305. Thus, the picture generator retrieves decoded Picture 17 from the cache storage 305 and displays Picture 17 in the preview display area 125.

In the second example 325, Picture 15 is an I-picture. Picture 16 is a P-picture that references Picture 15. Picture 17 is also an I-picture. Picture 18 is a B-picture that references Pictures 17 and 19. Picture 19 is a P-picture that references Picture 17. In this example, none of the video pictures within the group has been decoded. Accordingly, when the playhead 135 reaches the location 180 that corresponds to the encoded Picture 19 in this example, the picture generator of some embodiments identifies a nearby picture that is fastest to decode. Some embodiments identify the picture that is fastest to decode as the picture with the smallest number of reference pictures, based on the assumption that the number of reference pictures serves as a good estimate of decoding time. Therefore, for each video picture in the group of nearby pictures, the picture generator computes a number of reference pictures that are directly or indirectly referenced by the picture. After computing the number of reference pictures for each of the nearby pictures, the picture generator selects a video picture that has the smallest number of computed reference pictures. In the second example 325, the I-picture 17 has the smallest number of reference picture as this picture is an intra-picture that does not reference any other frame. Therefore, the picture generator selects Picture 17 for display in the preview.

Figure 4:
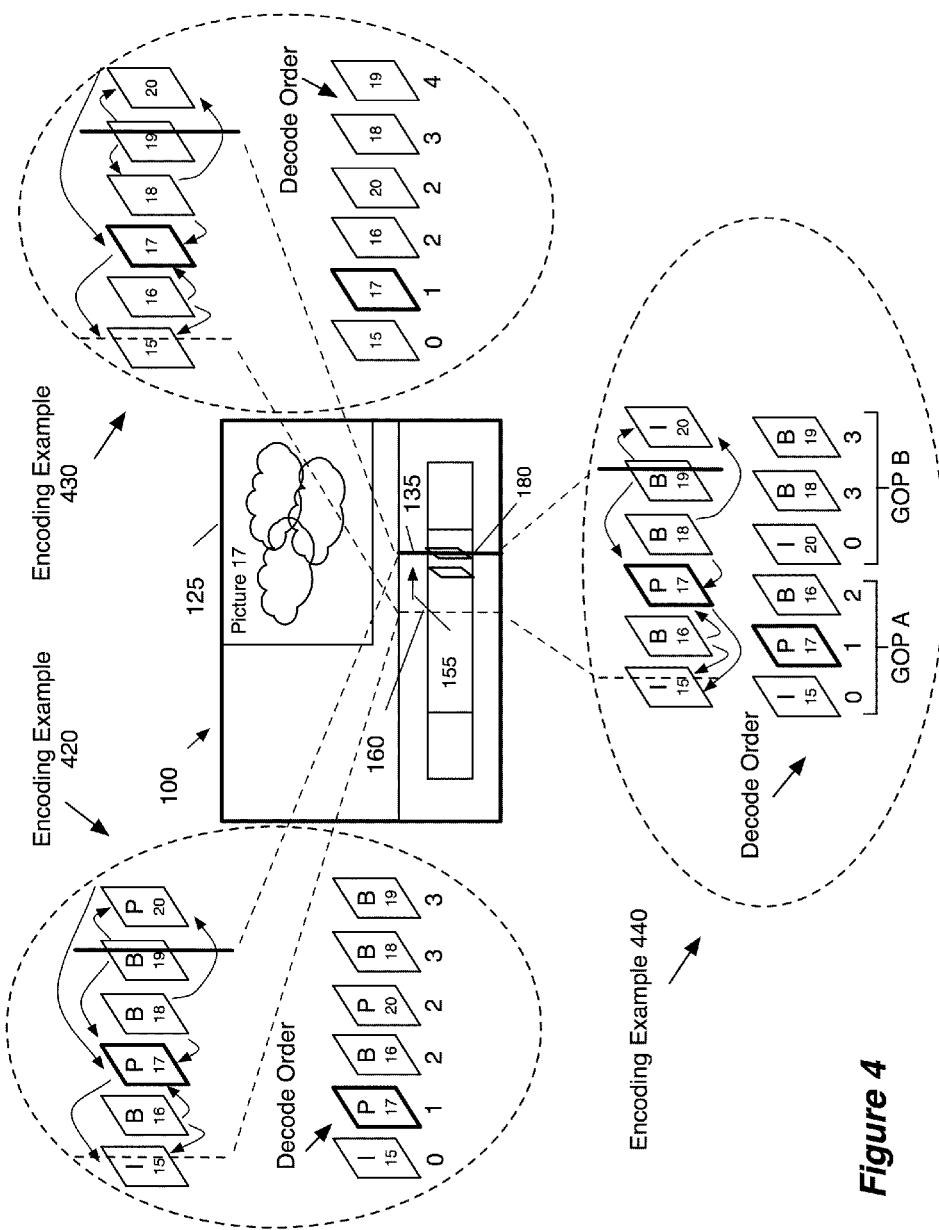
FIG. 4 illustrates several examples of selecting pictures for display when a user skims through a video clip.

FIG. 3 illustrates two examples of selecting a picture for display when at least one picture within a nearby group of pictures is a cached decoded picture or an intra-picture. FIG. 4 illustrates three additional examples 420, 430, and 440 of selecting a picture for display during the skimming operation. The nearby group of pictures in none of these three examples includes a cached, decoded picture or an intra-picture. In other words, each of these examples in FIG. 4 illustrates a case where the application's picture generator has to select a nearby picture that has to be decoded before it can be presented in lieu of the current picture.

Like FIG. 3, FIG. 4 illustrates its examples by reference to the third stage 115 of FIG. 1. In this stage, the playhead 135 has moved from the previous location 160 to the current location 180 over the second video clip 170, and the current location 180 corresponds to encoded Picture 19, which serves as the current picture. Again, since Picture 19 has not been decoded, the picture generator has to select a picture to display in lieu of Picture 19 from a group of nearby pictures that are associated with the current picture.

The three examples illustrated in FIG. 4 present different variations of what the nearby group of pictures could include and how they could be encoded. In these examples, the group of nearby pictures are pictures that are located between the picture 15 associated with the previous location 160 of the playhead and the current picture 19 associated with the current location 180 of the playhead 135. Also, in these examples, the group of pictures includes four pictures 16 to 19.

In the first encoding example 420 of FIG. 4, an MPEG2 encoder has been used to encode the pictures of the second video clip 170. Also, in this example, (1) Picture 15 is an I-picture that does not reference any other pictures, (2) Picture 16 is a B-picture that references Pictures 15 and 17, (3) Picture 17 is a P-picture that references Picture 15, (4) Picture 18 is a B-picture that directly references Pictures 17 and 20, (5) Picture 19 is a B-picture that directly references Pictures 17 and 20, and (6) Picture 20 is a P-picture that directly references Picture 17. Pictures 18, 19 and 20 can be viewed as indirectly referencing Picture 15 through their direct reference to Picture 17. In other words, these three pictures are indirectly dependent on the decoding of Picture 15 through their direct dependence on the decoding of Picture 17.

Given that the current picture 19 is not stored in a decoded state in the cache, the picture generator needs to select and decode a picture from the group of nearby pictures. When none of the nearby pictures in the group is stored in a decoded state, the picture generator of some embodiments selects a nearby video picture that has the smallest number of reference pictures. Different embodiments provide different methods to compute the number of reference pictures for a video picture. In some embodiments, the picture generator first identifies the closest intra-picture in a decode order from which a decoder can start decoding in order to decode the particular picture (i.e., the farthest intra-picture in the decode order that is directly or indirectly referenced by the particular picture). The picture generator then counts from the particular picture to the identified intra-picture in the decode order, the number of reference pictures that are directly or indirectly referenced by the particular picture.

The first example 420 shows the decode order of its set of pictures. In this decode order, the I-Picture 15 comes first as it is an intra-picture, does not reference any other picture, and is prior to the other pictures in the display order. Picture 15 is followed by Picture 17, which even though is after Picture 16 in the display order, is needed for the decoding of Picture 16 (as well as several other pictures). Next in the decode order is Picture 16, which is a B-picture that directly references both Pictures 15 and 17, and is before Picture 18, 19, and 20 in the display order. Picture 16 is followed by Picture 20, which even though is after Pictures 18 and 19 in the display order, is needed for the decoding of these two pictures. Picture 20 also indirectly references (i.e., indirectly depends on the decoding of) Picture 15 through its direct reference to Picture 17. Picture 20 is then followed by Pictures 18 and 19, which directly reference Pictures 17 and 20, and indirectly reference Picture 15.

In this example, the closest intra-picture from which a decoder can start decoding in order to decode Picture 19 is Picture 15 (i.e., the farthest intra-picture in the decode order that is directly or indirectly referenced by Picture 19 is Picture 15). Therefore, from Picture 19 to Picture 15 in the decode order, the picture generator counts the number of reference pictures that are directly or indirectly referenced by Picture 19. There are five different pictures between Picture 19 to Picture 15. However, among these five pictures, only Picture 20, Picture 17, and Picture 15 are directly or indirectly referenced by Picture 19. Thus, the picture generator determines that Picture 19 has a count of three reference pictures. In other words, a decoder is required to decode three other pictures in order to decode Picture 19. In counting the number of reference pictures that are directly or indirectly referred to by a particular picture, the picture generator of some embodiments does not count any reference picture that it has previously counted in a direct or indirect reference of the particular picture. Thus, for Picture 19, the picture generator counts Picture 17 only once, even though Picture 19 directly references Picture 17 and indirectly references it through Picture 20.

Similarly, the closest intra-picture from which a decoder can start decoding in order to decode Picture 18 is Picture 15. Therefore, from Picture 18 to Picture 15 in the decode order, the picture generator counts the number of pictures that are directly or indirectly referenced by Picture 18. Among the four different pictures between Picture 18 to Picture 15, only Picture 20, Picture 17, and Picture 15 are referenced by Picture 18. Thus, the picture generator determines that Picture 18 has a count of three reference pictures. In other words, a decoder is required to decode three other pictures in order to decode Picture 18.

Using the same method, the picture generator determines that Picture 16 has a count of two reference pictures, while Picture 17 has a count of one reference picture. Therefore, in the first example 420, Picture 17 is selected for decoding and display (as indicated by the thickened border) in lieu of Picture 19, because Picture 17 has the fewest counted number of direct and indirect reference pictures within the group.

The first example 420 illustrates performing a picture selection operation on a set of MPEG2 encoded pictures that have a restrictive picture dependency structure. For example, none of the B-pictures (pictures that reference more than one other picture) encoded with MPEG2 can be referenced by any other picture. Other encoding methods (e.g., H.264) allow a dependency structure that is more liberal. For example, H.264 allows a picture that references more than one other picture to be referenced by another picture.

The second example 430 illustrates performing a picture selection operation on a set of pictures that have been encoded with such an encoding method. As shown, the dependency structure of Pictures 15 to 20 is identical to that of the first example except for Picture 19. In the second example, instead of referencing Picture 17 and Picture 20, which are pictures that directly reference only one other picture, Picture 19 references Picture 18 (i.e., a picture that references more than one picture) and Picture 20.

As in the first example 420, the picture generator for the second example 430 initially identifies a group of nearby pictures that includes Pictures 16 to 19, and then computes the number of reference pictures that are directly or indirectly referenced by each picture in the group. In the second example, the decode order of the set of pictures is again as follows: Picture 15, Picture 17, Picture 16, Picture 20, Picture 18, and Picture 19.

In this example, the closest intra-picture from which a decoder can start decoding in order to decode Picture 19 is Picture 15. Therefore, from Picture 19 to Picture 15 in the decode order, the picture generator counts the number of reference pictures that are directly or indirectly referenced by Picture 19. There are five different pictures from Picture 19 to Picture 15. Among the five pictures, Picture 20, Picture 18, Picture 17, and Picture 15 are directly or indirectly referenced by Picture 19. Thus, the picture generator determines that Picture 19 has four reference pictures. In other words, a decoder is required to decode four other pictures in order to decode Picture 19. Given that the picture referencing is the same for the remaining Pictures 15-18 in the first and second examples 420 and 430, the picture generator computes the same counts for Pictures 15-18 in the same manner in these two examples. Similarly, in the second example 430, the picture generator ends up selecting Picture 17 (as indicated by the thickened border) as having the smallest reference picture count within the identified group of Pictures 15-19. In the second example 430, the picture generator thus decodes Picture 17 and displays this picture in lieu of Picture 19.

The first and second examples 420 and 430 illustrate scenarios where pictures are selected for display from encoded videos having a closed-GOP structure. In a closed-GOP structure, none of the pictures in the video references any picture that is located before the closest preceding intra-picture in a decode order. On the other hand, video pictures in an open-GOP structure may reference video pictures located prior to the closest preceding intra-picture in a decode order.

The third example 440 illustrates a scenario where a picture is selected for display from an encoded video having an open-GOP structure. In this example, the sequence of pictures includes (1) Picture 15, which is an I-picture that does not reference any other picture, (2) Picture 16, which is a B-picture that directly references Pictures 15 and 17, (3) Picture 17, which is a P-picture that directly references Picture 15, (4) Pictures 18 and 19, which are B-pictures that directly reference Pictures 17 and 20, and (5) Picture 20, which is an I-picture that does not reference any other picture. As in the first and second examples 420 and 430, Pictures 18 and 19 can be viewed as indirectly referencing Picture 15 through their direct reference to Picture 17. In other words, these two pictures are indirectly dependent on the decoding of Picture 15 through their direct dependence on the decoding of Picture 17.

Also as in the first and second encoding examples 420 and 430, the picture generator for the third example 440 initially identifies a group of nearby pictures associated with Picture 19 that includes Pictures 16 to 19, and then computes the number of reference pictures that are directly or indirectly referenced by each picture in the group. In the third example, the decode order of the set of pictures is as follows: Picture 15, Picture 17, Picture 16, Picture 20, Picture 18, and Picture 19. In this decode order, Picture 15 comes first as it is an intra-picture, does not reference any other picture, and is prior to the other pictures in the display order. Picture 15 is followed by Picture 17, as it is a P-picture that just directly references Picture 15 and is referenced by Picture 16. Picture 17 precedes in the decode order Picture 18-20 (including I-Picture 20) because Picture 17 is before these pictures in the display order and does not refer to any of these pictures directly or indirectly for its decoding. After Picture 17, the decode order has Picture 16, since it is a B-picture that directly references Picture 15 and Picture 17.

Picture 16 is followed by Picture 20, which even though is after Pictures 18 and 19 in the display order, is needed for the decoding of Pictures 18 and 19, as it is an intra-picture, does not reference any other picture, and is referenced by Pictures 18 and 19. Next in the decode order are Pictures 18 and 19, which are B-pictures that directly reference both Pictures 17 and 20, and indirectly reference Picture 15. As shown in this example, Pictures 15, 16, and 17 belong to the same encoding GOP (i.e., GOP A), and Pictures 18, 19, and 20 belong to another encoding GOP (i.e., GOP B).

In the first and second encoding examples 420 and 430, the closest intra-picture that a decoder can start decoding for a particular picture always belongs to the same encoding GOP as the particular picture does. This third example 440 illustrates that in an open-GOP structure, the closest intra-picture that a decoder can start decoding for a particular picture may belong to the encoding GOP before the encoding GOP of the particular picture. In addition, unlike encoding examples 420 and 430 in which all the pictures within the group of nearby pictures are pictures that belong to the same encoding GOP, the example 440 illustrates that pictures in the group of nearby pictures may belong to different encoding GOPs in some embodiments.

Even though Picture 19 in the example 440 belongs to encoding GOP B, the closest intra-picture from which a decoder can start decoding in order to decode Picture 19 is Picture 15 of encoding GOP A. Therefore, from Picture 19 to Picture 15 in the decode order, the picture generator counts the number of reference pictures that are directly or indirectly referenced by Picture 19. Pictures 15, 17, and 20 are directly or indirectly referenced by Picture 19. Thus, the picture generator determines that Picture 19 has a count of three reference pictures. In other words, a decoder is required to decode three other pictures in order to decode Picture 19. Using the same method, the picture generator determines that Picture 18 also has a count of three reference pictures, Picture 17 has a count of one reference picture, and Picture 16 has a count of two reference pictures. In addition, Picture 20 has a count of zero reference picture as Picture 20 is an intra-picture that does not reference to any other picture. After determining the number of reference pictures for each picture in the group, the picture generator of some embodiments selects Picture 17 (as indicated by the thickened border) for decoding and display in lieu of the Picture 19, because Picture 17 has the fewest computed number of reference pictures within the group of nearby pictures.

Other embodiments may compute the number of referenced pictured and/or select the substitute picture for display differently. For instance, in the example 440, Picture 20 precedes the current picture in the decode order even though Picture 20 is after the current picture in the display order. The picture generator of some embodiments not only includes Picture 20 as part of the group of nearby pictures for the purposes of counting the number of referenced pictures, but also includes Picture 20 in the group of pictures from which the generator can pick the substitute picture to show in place of the current picture at the current location of the playhead. Thus, in these embodiments, the picture generator selects Picture 20 as Picture 20 has the smallest number of reference pictures within this group of nearby pictures. This selection is based on an assumption that it is appropriate to select a picture that is beyond the current location of the playhead in the direction of the playhead motion (i.e., in this example, is ahead of the current Picture 19), because the display of the selected picture does not have to signify an exact location of the playhead but rather a relative position within the composite presentation. Moreover, given that Picture 20 is the I-Picture associated with the Picture 19, in some ways it is more representative of Picture 19 than the previous encoding GOP's encoding Picture 17.

Several additional examples of selecting video pictures for decoding will be described further below by reference to FIG. 9. In that example, as well as the examples described above by reference to FIGS. 3 and 4, the video pictures are encoded based on the MPEG2 or H.264 encoding standards. However, one of ordinary skill in the art will realize that the picture selection operation may be performed the same way on videos that are encoded with other encoding methods.

Furthermore, in many examples described above and below by reference to FIGS. 1, 3, 4, 9, 11, 14, and 15, the playhead or skimming tool is shown to move from left to right along a timeline that spans from left to right (i.e., to move from an earlier point in time to a later point in time). Accordingly, much of the discussions above and below are about selecting a nearby picture from a set of pictures that are typically before the current picture at the current location of the playhead. The use of this terminology, however, should not imply that the selection of the group or picture is always made from the pictures that precede the current location of the skimming tool. This is because, in instances when the skimming tool (e.g., playhead) moves from right to left along a timeline that spans from left to right (i.e., moves back in time), the preview generator of some embodiments identifies nearby pictures that are after the current location of the skimming tool (i.e., that are to the right of the current location) or that are mostly after the current location of the skimming tool.

Accordingly, the preview generator of some embodiments can select the nearby group of pictures and a picture in the nearby group of pictures from pictures before or after the current location of the skimming tool depending on the direction of movement of the skimming tool. In other words, when a skimming tool moves from a first location to a second current location in a particular direction (e.g., from right to left along a timeline that spans from left to right), the skimming tool selects a nearby group of pictures that include only or mostly pictures that are between the pictures associated with the first and second locations. This is because these in-between pictures are the pictures over which the skimming tool has conceptually moved, which makes one of them a more acceptable choice as a temporary substitute picture for the current picture at the second current location of the skimming tool than the picture at the first location of the tool or a picture beyond the second location of the tool. However, as described above by reference to the encoding example 440 of FIG. 4, some embodiments do allow selection of intra-encoded picture that is beyond the second current location of the tool in some situations when the movement of the tool spans multiple encoding GOPs.

Also, as described above by reference to FIGS. 3 and 4, the picture generator of some embodiments identifies a picture that is "fastest" to decode based on its number of direct and indirect reference pictures. Other embodiments, however, use different techniques to select the easiest nearby video picture to present or the fastest nearby video picture to decode. For instance, in other embodiments, the picture generator computes a metric score that estimates the decoding time for each video picture based on the size of the particular picture, the size of the reference pictures, and the number of reference pictures of the particular picture. Based on the computed metric scores, the picture generator selects the nearby video picture to decode and present the preview display for a particular location of the skimming tool that does not have a decoded video picture.

Several more detailed embodiments of the invention are described in the sections below. Section I further describes the preview generator of the media-editing application. Section II follows with a description of a process that the preview generator performs in some embodiments to identify and present a new picture each time the playhead moves to a new location. Next, Section III describes the media-editing application of some embodiments in more detail. Section IV then describes the architecture of the media-editing application of some embodiments. Section V follows with a description of other applications that can utilize some embodiments of the invention. Finally, Section VI describes an electronic system that implements some embodiments of the invention.

I. Preview Generator

Figure 5:
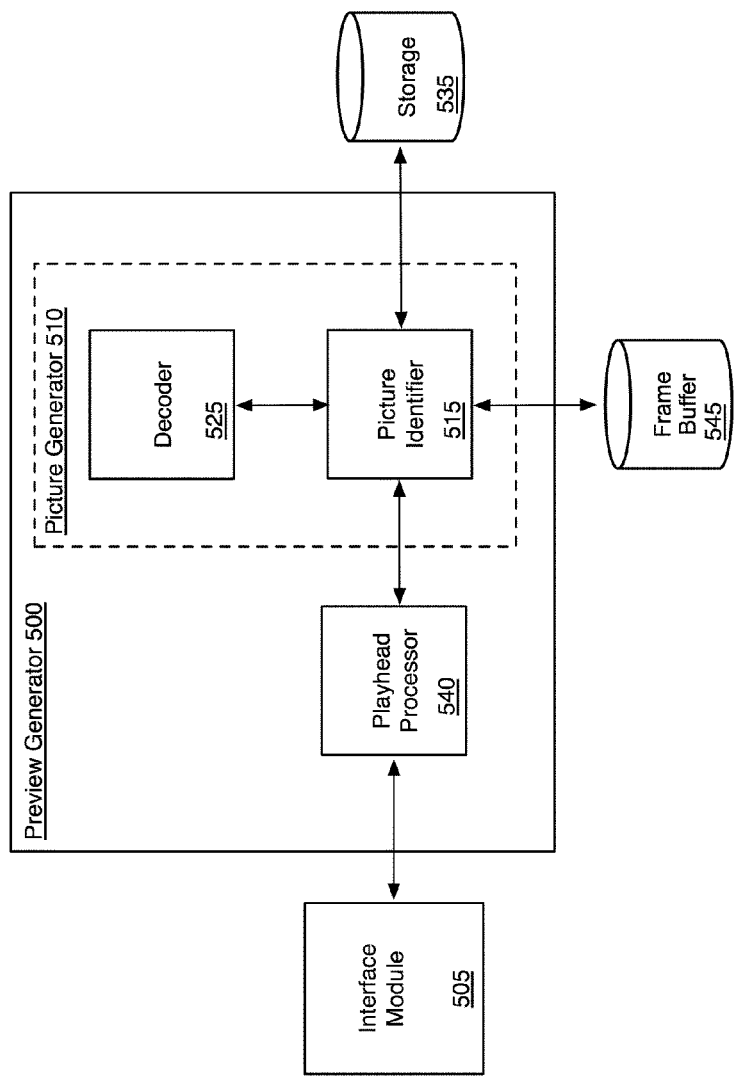
FIG. 5 conceptually illustrates a software architecture of a media-editing application of some embodiments.

FIG. 5 conceptually illustrates a preview generator 500 of a media-editing application of some embodiments. Whenever a playhead scrolls across one or more video clips of a composite presentation that is defined in a timeline, the preview generator quickly generates successive preview displays of the video pictures that are at or near the location of the playhead, in order to provide feedback regarding the content of the composite presentation at different locations of the playhead. When the playhead moves to a location on a video clip icon that is associated with a video picture that the device has decoded and stored, the picture generator presents the decoded version of the video picture. However, when the playhead moves to a particular location that is associated with a particular video picture for which the device does not have a stored, decoded version, the picture generator identifies a nearby video picture that is easier to decode than the particular video picture and the other nearby video pictures. After the playhead has stayed at the particular location for a duration of time, the picture generator in some embodiments decodes the particular video picture and presents this decoded picture in its preview display.

As shown in FIG. 5, the preview generator 500 includes a playhead processor 540, a picture identifier 515, and a decoder 525. The picture identifier 515 and the decoder 525 together form a picture generator 510 of the preview generator. The picture generator identifies and/or decodes a video picture each time that the playhead processor 540 notifies the picture generator that the playhead is at a new location. Specifically, through the interface module 505, the playhead processor 540 receives input that specifies an interaction with the playhead. In some embodiments, the interface may be a user interface that relays a user input (e.g., a cursor/touch-screen selection, movement, or drag operation), or another module's interface that relays input, associated with the playhead.

The playhead processor analyzes such input. When this processor 540 determines that an input specifies a new location for the playhead in the timeline, it calls the picture identifier 515 of the picture generator 510 in order to initiate a picture generation process that, for the new location of the playhead, generates a new picture for the preview display. This processor also initiates a timer each time that it calls the picture identifier to generate a new video picture for the preview display. This timer expires each time that the playhead stays at a location for a particular period of time because, during this period, the playhead processor does not detect a new movement of the playhead and thereby does not re-initialize the timer. Upon the expiration of the timer, the playhead processor directs the picture generator 510 to decode the video picture associated with the current location of the playhead, if the picture generator did not display this video picture when it was called last.

In some embodiments, the picture identifier 515 performs the process 200 that was described above by reference to FIG. 2, with the exception of the decoding operation 230 of this process, which is performed by the decoder 525. Specifically, each time that the playhead processor notifies the picture identifier of a new location for the playhead, the picture identifier performs a series of operations to identify a video picture for displaying in the preview display area.

For example, for a new location of the playhead, the picture identifier 515 may determine that a current picture associated with the current location is currently stored in a decoded format in the storage 535 of the application. In some embodiments, the storage 535 is memory space allocated for the media application in a device's volatile memory (e.g., RAM) and/or its non-volatile memory (e.g., disk, flash memory, etc.). In some embodiments, the storage 535 has a portion that stores decoded version of the video pictures that the preview generator 500 has decoded in providing a preview of the video. The amount of memory allocated to the cache storage for storing the decoded video pictures is often finite, which in some embodiments requires purging of decoded pictures from the allocated memory whenever the application usage of this memory reaches its limits. When the picture identifier 515 determines that the current picture is decoded and stored in the cache storage, the picture identifier 515 stores the current picture to the frame buffer 545, from which it can be retrieved and displayed in the preview display area of the media-editing application.

Figure 6:
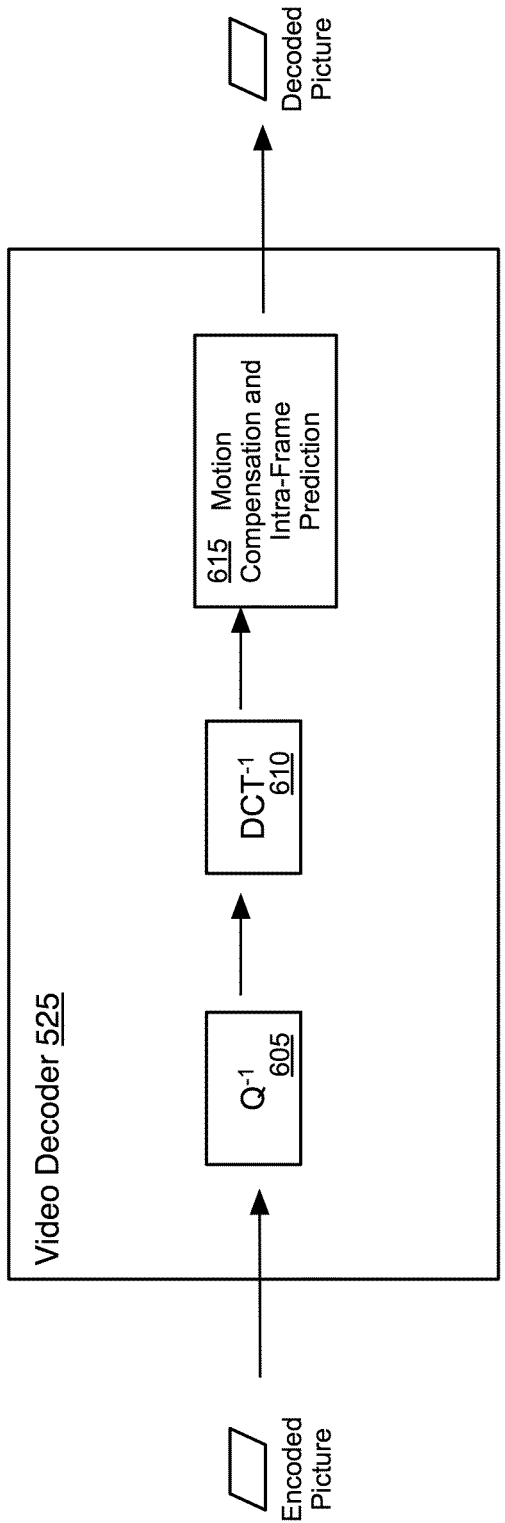
FIG. 6 conceptually illustrates a software architecture of a video decoder.

Alternatively, for a new location of the playhead, the picture identifier 515 may determine that a current picture associated with the current location is not currently stored in a decoded format in the cache storage. In this situation, the picture identifier has to identify a group of nearby video pictures that are associated with the current picture. It then has to determine whether this group has a decoded picture in the cache storage. If so, it retrieves this decoded picture and stores it in the frame buffer 545 for display. Otherwise, it has to identify a picture in the group that is fastest to decode, retrieve the encoded picture from the storage 535, direct the decoder 525 to decode this picture, and then store the resulting decoding frame in the frame buffer 545 for display. The decoder 525 in some embodiments is a typical video decoder that is used to decode an encoded video picture. FIG. 6 illustrates an example of the decoder 525. As shown in FIG. 6, the decoder 525 includes an inverse quantizer unit 605, an inverse discrete cosine transform (IDCT) unit 610, and a motion-compensation, intra-prediction unit 615. The inverse quantizer unit 605 receives an encoded picture and performs a quantization inversion on the encoded picture. The inverse DCT unit 610 performs DCT inversion on the picture. The unit 615 uses content of another picture(s) (i.e., reference picture(s) and temporal prediction information) or content within the same picture to compensate the output of the inverse DCT unit 610 in order to reconstruct and decode the picture. In some embodiments, the operation of motion compensation for a picture requires decoding of one or more other reference pictures.

The operation of the preview generator 500 will now be described by reference to FIG. 7. This figure presents the state diagram 700 that represents various operations of the preview generator 500 in some embodiments. One of ordinary skill in the art will recognize that the state diagram does not describe all states of the preview generator, but instead specifically pertains to its operations during skimming of the composite presentation.

Figure 7:
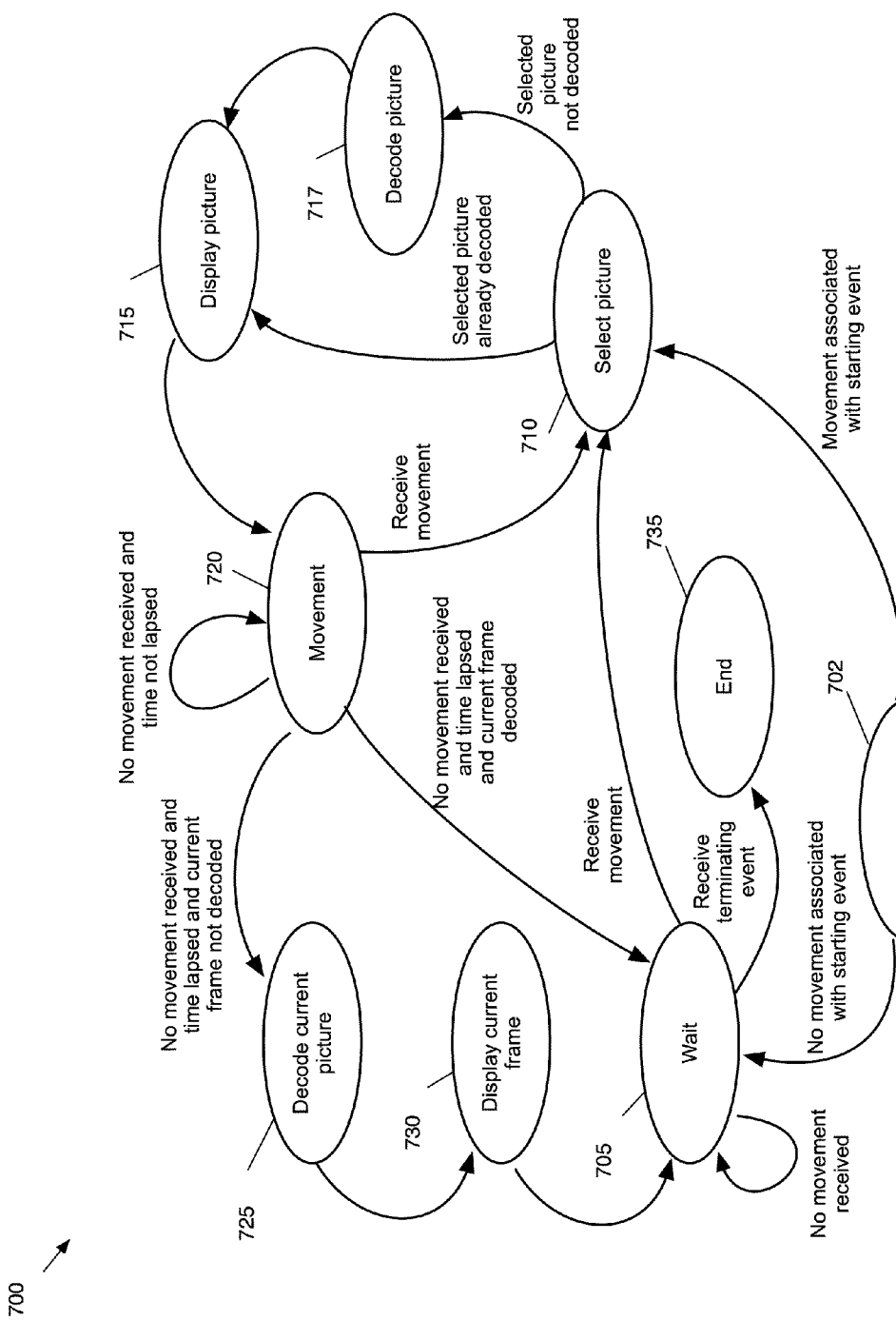
FIG. 7 conceptually illustrates a state diagram of a preview generator of some embodiments.

As shown in FIG. 7, an initial state of the preview generator is a start state 702. The preview generator enters this state differently in different embodiments of the invention. In some embodiments, it enters this state when a playhead is selected (e.g., through a cursor or touch-screen selection operation) in the timeline. In these or other embodiments, the preview generator can enter the start state without the playhead being selected by a user. For instance, as further described below by reference to FIG. 11, the media-editing application of some embodiments detects when a cursor or touch-screen contact has entered the timeline, dynamically produces a skimming playhead at the location of the cursor/contact, and moves the playhead with the movement of the cursor/contact. In some of these embodiments, the preview generator enters the start state each time that the media application detects that the cursor or touch-screen contact has just entered the timeline.

From the start state 702, the preview generator immediately transitions to the wait state 705 in some cases, or to the select-picture state 710 in other cases. For instance, when the preview generator enters its start state 702 upon selection of a playhead, the preview generator of some embodiments transitions to the wait state 705 to wait for a detected movement of the playhead. Alternatively, when the preview generator enters its start state 702 upon the cursor or touch-screen contact entering the timeline, the preview generator of some embodiments transitions to the select-picture state 710.

When the preview generator is in its wait state 705, its stays within this state until its playhead processor 540 detects (1) a terminating event or (2) a movement of the playhead. Different events can serve as terminating events in different embodiments. In some embodiments, the terminating event can include the de-selection of the playhead, the departure of the cursor or the touchscreen contact from the timeline, etc. Upon detecting a terminating event, the preview generator transitions to end state 735 to terminate its operation.

When the preview generator detects a movement of the playhead while this generator is in its wait 705, the preview generator transitions to select-picture state 710. At state 710, the preview generator selects a picture for displaying using the process described above by reference to FIGS. 1, 2, 3, and 4. A more detailed elaboration of this process will be described below by reference to FIGS. 8 and 9. In some embodiment, the picture identifier 515 of the preview generator performs the picture selection operation in the state 710.

After selecting (at state 710) for display in the preview, the preview generator transitions to either state 715 or 717 depending on whether the picture selected at 710 is a decoded picture. When the selected picture is not a decoded one (i.e., when the picture identifier identifies a nearby picture that is not stored in a decoded state), the picture identifier 515 transitions to state 717, where it directs the decoder 525 to decode the selected picture. Upon receiving the decoded picture from the decoder, the picture identifier transitions to the display-picture state 715.

The picture identifier also transitions from state picture-select 710 to the display-picture state 715 when it selects at 710 a picture that is decoded. At state 715, the picture identifier stores the selected, decoded picture in the frame buffer for display in the preview display area of the media-editing application. After storing the selected, decoded picture for display, the preview generator transitions to the movement-detect state 720. The preview generator stays at the movement state so long as (1) the playhead processor has not detected any other playhead movement and (2) an idling time period has not expired.

When the preview generator receives additional movements of the playhead while the generator is in the movement-detect state 720, the preview generator transitions to state 710, which was described above. Alternatively, when the preview generator does not receive any movement of the playhead for the duration of idling time period while it is in the movement-detect state, the preview generator transitions to either state 705 or 725. Upon the expiration of the idling time period, the picture generator transitions to the wait state 705 when the last picture that was displayed (at 715) in the preview display area is a decoded version of the current picture associated with the current playhead location. The operation of the picture generator during the wait state 705 was described above.

Alternatively, upon the expiration of the idling time period, the picture generator transitions from movement-detect state 720 to the decode state 725, when the last picture that was displayed (at 715) in the preview display area was one of the nearby pictures instead of the current picture associated with the current playhead location. In the decode state 725, the playhead processor directs the picture identifier to decode the current picture, which in turn causes the picture identifier to direct the decoder to perform this decode operation. After receiving the decoded current picture, the picture identifier transitions to state 730, where it stores the selected, decoded picture in the frame buffer for display in the preview display area of the media-editing application. After storing the selected, decoded picture for display, the preview generator transitions to the wait state 705, which was described above.

II. Picture Selection Process

Figure 8:
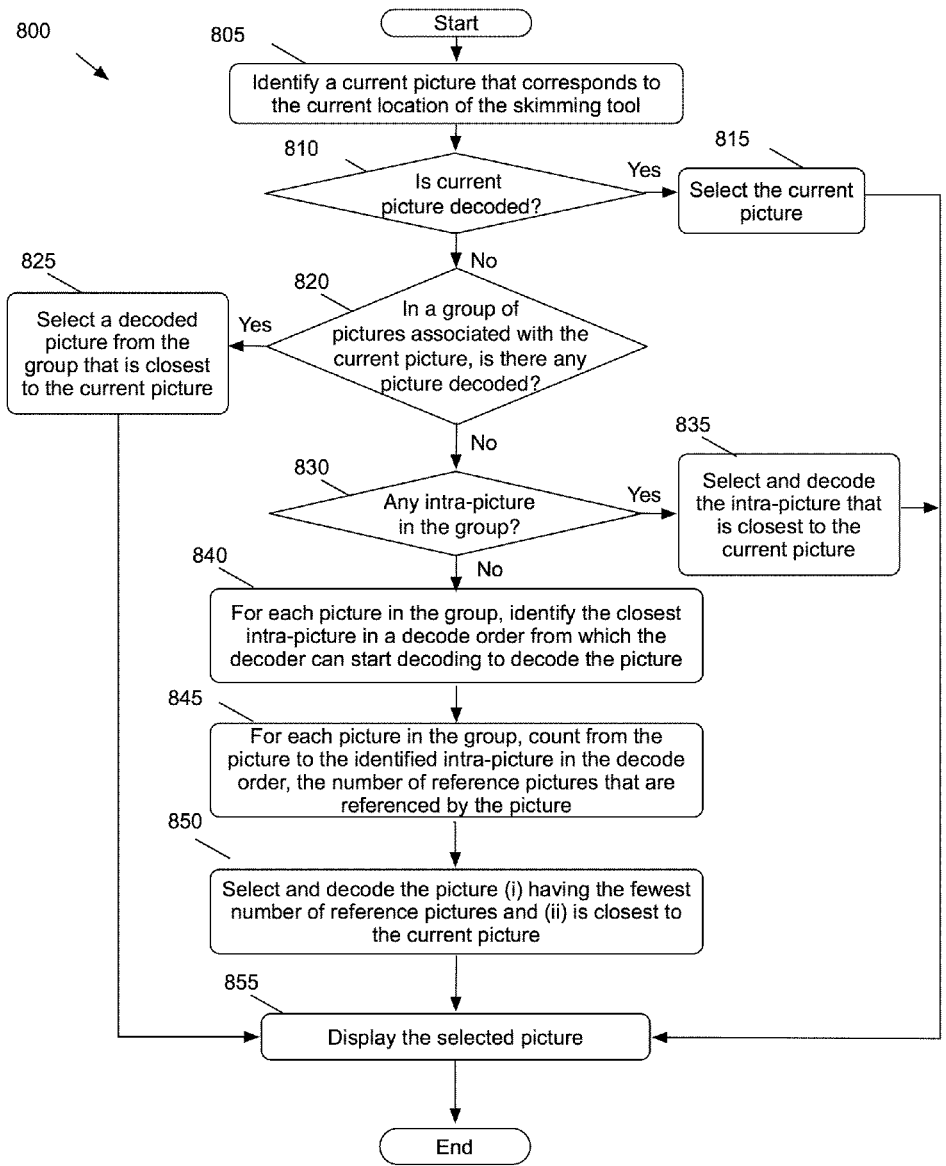
FIG. 8 illustrates a process of some embodiments for selecting pictures for a video preview when a user skims through a video clip.

FIG. 8 conceptually illustrates a process 800 that the application's picture generator performs in some embodiments to select and display a video picture after movement of the playhead from a first location to a second location in the timeline. Some embodiments perform this process upon receiving notification of the movement of the playhead between the first and second locations (at 710 of FIG. 7). The process 800 is identical to the process 200 of FIG. 2 except that the process 800 explains the step of selecting a picture that is easiest to decode (step 230 of FIG. 2) in more detail. Furthermore, the process 800 will be described by reference to FIG. 9, which provides an example of performing several different steps of the process 800 by the picture generator of some embodiments. Specifically, FIG. 9 illustrates an example of the picture selection process in terms of four different stages: 905, 910, 915, and 920. As shown in FIG. 9, the video track 130 includes three video clip icons representing three video clips 165, 170, and 175. The series of video pictures below the video track 130 represent the video pictures that are associated with different locations of the clip icons. In addition, FIG. 9 also shows the cache storage 535 for storing decoded pictures that have been decoded by the preview generator when the preview generator provides a preview of the video.

Figure 9:
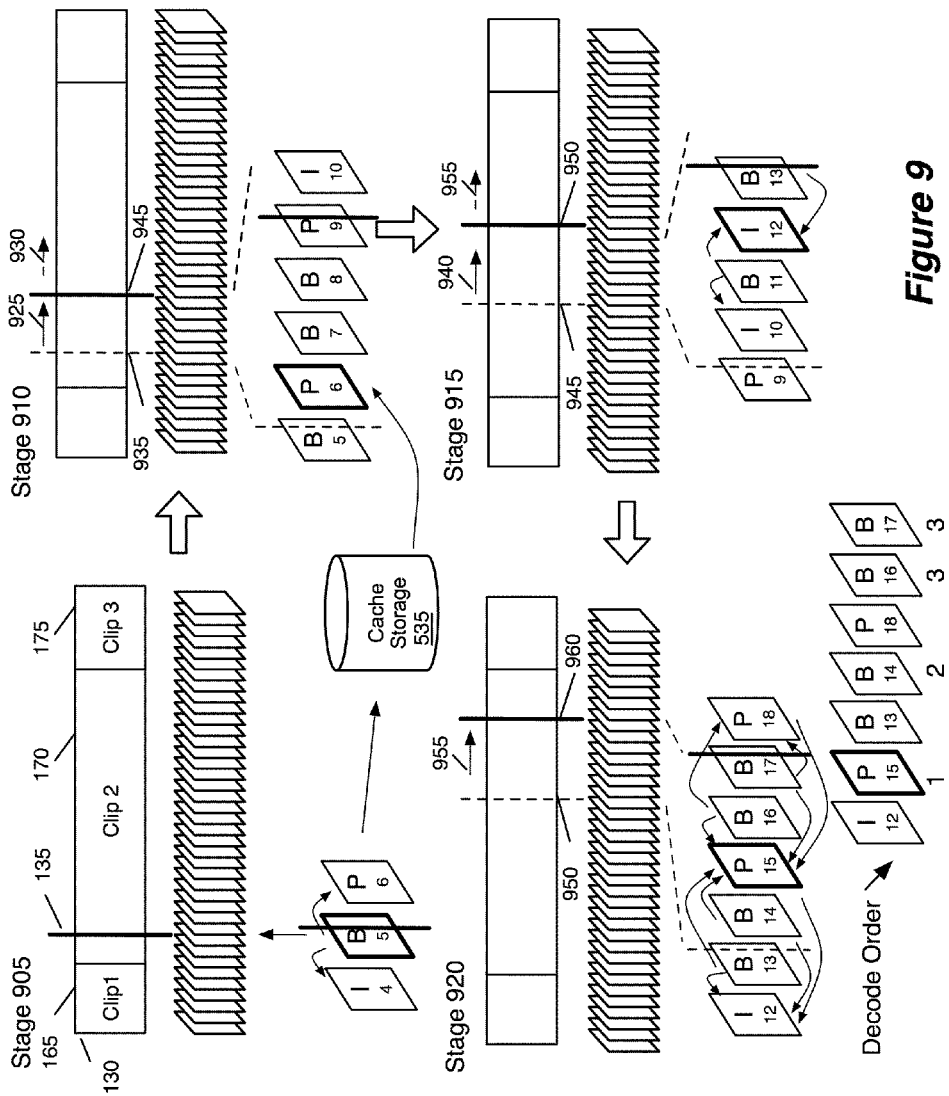
FIG. 9 illustrates additional examples of selecting pictures for a video preview when a user skims through a video clip.

In the first stage 905 of FIG. 9, the playhead 135 is idle (i.e., not moving) at a location of the second video clip 170. This location corresponds to Picture 5 of the second video clip 170. For this location, the media-editing preview generator decodes and displays Picture 5 as the selection tool 135 has been at this idle location for a sufficiently long duration of time. In this example, Picture 5 is a B-picture that directly references Picture 4 and Picture 6 (i.e., decoding of Picture 5 is dependent on decoding of Pictures 4 and 6). Thus, in order for the preview generator to decode and display Picture 5, the preview generator also decodes Pictures 4 and 6. In some embodiments, after the preview generator decodes the pictures for presenting in a preview display area, the preview generator stores the decoded pictures in a storage (e.g., cache storage 535) for subsequent use. As shown in this first stage 905, after decoding Pictures 4, 5, and 6, the application's preview generator stores the decoded versions of Pictures 4, 5, and 6 in the cache storage 535.

In the second stage 910, the user has started skimming through content of the video clip 170 by moving the playhead 135 forward (e.g., through a click-and-drag operation, through a touch screen contact and movement, etc.). In this stage, the solid line 945 indicates the current location of the playhead 945. The dotted line 935 indicates the playhead's previous location. The solid arrow 925 indicates the movement of the playhead from location 935 to location 945. The dotted arrow 930 indicates the playhead's continuing movement to the right on the video track 130. As shown in the second stage 910, the playhead 135 has moved from the previous location 935 over the second video clip 170 to the current location 945 over the second video clip 170.

The picture generator of some embodiments begins executing the process 800 of FIG. 8 at the stage 910, as the picture generator receives movement of the playhead 135 from location 935 to location 945. Referring back to FIG. 8, the process 800 begins by identifying (at 805) a current video picture that corresponds to the current location of the playhead on the video clip icon. Referring to FIG. 9, the picture generator identifies Picture 9 as the current picture that corresponds to the current location 945 of the playhead 135 in the second stage 910.

Referring back to FIG. 8, the process then determines (at 810) whether the identified current picture has been decoded and stored in cache storage of the application. In some embodiments, the cache storage is memory space allocated for the application in the device's volatile memory (e.g., RAM) and/or its non-volatile memory (e.g., disk, flash memory, etc.). The amount of allocated memory is often finite, which in some embodiments requires purging of decoded pictures from the allocated memory whenever the application usage of this memory reaches its limits.

When the process determines (at 810) that the current picture is decoded and stored in the cache, the process selects (at 815) the identified current picture. The process then displays (at 855) the selected picture. On the other hand, when the process determines (at 810) that the current picture is not currently stored in the cache in a decoded manner, the process determines (at 820) whether there are any decoded pictures in a group of nearby pictures associated with the current picture. When the process determines (at 820) that there is one or more cached decoded video pictures within the group of nearby pictures, the process selects (at 825) a decoded picture that is located closest to the current picture in the group of pictures associated with the current picture. The process then displays (at 855) the selected cached and decoded picture.

Referring to the second stage 910 of FIG. 9, since the current picture, Picture 9, is not currently stored in the cache in a decoded manner, the picture generator identifies a group of nearby pictures for this playhead location 945 and determines whether there are any decoded pictures in the group of nearby pictures. For this playhead location 945, the picture generator identifies a group of nearby pictures that include pictures between Picture 5 (i.e., the picture associated with location 935 of the playhead) and Picture 9 (i.e., the current picture associated with the location 945 of the playhead). As shown in this second stage, the group of nearby pictures includes Picture 6 to Picture 9. Among the pictures in the group, the picture generator determines that only Picture 6 has been previously decoded and stored (during the first stage 905) in the cache storage 535 while Pictures 7 through 9 have not been decoded and stored in the storage. Accordingly, when the playhead reaches the location 945 that corresponds to Picture 9 in this stage, the picture generator selects Picture 6 (as indicated by the thickened border) as the picture that is closest to the current picture and that is stored in a decoded state in the cache storage 535. Thus, the picture generator retrieves decoded Picture 6 from the cache storage 535 and displays Picture 6 in the preview display area.

Referring back to FIG. 8, when the process determines (at 820) that there is no decoded video picture within the group, the process determines (at 830) whether there is any intra-picture in the group of nearby pictures. When the process determines (at 830) that there is one or more intra-pictures within the group of nearby pictures, the process selects (at 835) an intra-picture that is located closest to the current picture in the group of pictures associated with the current picture. The process then displays (at 855) the selected intra-picture.

Referring to the third stage 915 of FIG. 9, the playhead 135 is shown to have moved further to the right (e.g., through a click-and-drag operation, through a touch screen contact and movement, etc.). In the stage 915, the solid line 950 indicates the current location of the playhead 135. The dotted line 945 indicates the playhead's previous location. The solid arrow 940 indicates the movement of the playhead from location 945 to location 950. The dotted arrow 955 indicates the playhead's continuing movement to the right on the video track 130. As shown in the second stage 910, the playhead 135 has moved from the previous location 945 over the second video clip 170 to the current location 950 over the second video clip 170. The stage 915 further illustrates that the current location 950 corresponds to Picture 13 of the second clip 170, which is now the current picture.

Given that the current Picture 13 is not stored in a decoded state in the cache storage 535, the picture generator needs to select a picture from a group of nearby pictures. In this example, the picture generator of the media-editing application identifies the nearby group of pictures as the group of pictures that includes pictures between Picture 9 (i.e., the picture associated with the previous location 945 of the playhead) and Picture 13 (i.e., the current picture associated with the current location 950 of the playhead). Accordingly, the group of nearby pictures includes Pictures 10 to 13. Since none of the pictures in the group of nearby pictures is stored in the cache storage 535 in a decoded state, the picture generator of some embodiments determines whether there exists at least one intra-picture within the group of nearby pictures. If there is at least one intra-picture within the group of nearby pictures, the picture generator selects the intra-picture that is located closest to the current picture and displays the intra-picture. As shown in this figure, Pictures 10 and 12 are I-pictures that do not reference any other pictures (i.e., have zero reference frames) while Pictures 11 and 13 directly or indirectly reference at least one other picture. When there is more than one video picture in the group having the smallest number of reference pictures, the picture generator of some embodiments selects one that is closest to the current picture. Accordingly, the picture generator decodes and displays Picture 12 (as indicated by the thickened border) in the preview display area as Picture 12 is the intra-picture that is closest to Picture 13 in the group of pictures associated with Picture 13.

Referring back to FIG. 8, when the process determines (at 830) that there is no intra-picture in the group, the process identifies (at 840) for each video picture in the group, the closest preceding intra-picture in the decode order from which a decoder can start decoding in order to decode the video picture. For each video picture in the group, the process counts (at 845) from the video picture to the identified intra-picture in the decode order, the number of reference pictures that are directly or indirectly referenced by the video picture. Next, the process selects and decodes (at 850) the video picture that (1) has the smallest number of counted reference pictures and (2) that is closest to the current picture. The process then displays (at 855) the selected picture. After 855, the process ends.

Referring to the fourth stage 920 of FIG. 9, the playhead 135 has moved further to the right (e.g., through a click-and-drag operation, through a touch screen contact and movement, etc.) from the previous location 950 over the video clip 170 to the current location 960. It further illustrates that the current location 960 corresponds to Picture 17 of the second clip 170, which is now the current picture. As shown in the fourth stage 920, (1) Picture 12 is an I-picture that does not reference any other pictures, (2) Pictures 13 and 14 are B-pictures that each references Pictures 12 and 15, (3) Picture 15 is a P-picture that references Picture 12, (4) Pictures 16 and 17 are B-pictures that each directly references Picture 15 and 18, and (5) Picture 18 is a P-picture that directly references Picture 15. Pictures 16, 17, and 18 can be viewed as indirectly referencing Picture 12 through their direct reference to Picture 15. In other words, these three pictures are indirectly dependent on the decoding of Picture 12 through their direct dependence on the decoding of Picture 15.

Given that the current Picture 17 is not stored in a decoded state in the cache storage 535, the picture generator needs to select and decode a picture from a group of nearby pictures. For this playhead location 960, the picture generator identifies the group of nearby pictures as a group of pictures that includes pictures between Picture 13 (i.e., the picture associated with the previous location 950 of the playhead 135) and Picture 17 (i.e., the picture associated with the current location 960 of the playhead 135). Accordingly, the group of pictures includes Pictures 14 to 17. Since none of the nearby pictures is stored in a decoded state in the cache or is an intra-picture, the picture generator needs to select a picture from the group that has the smallest number of reference frames. For this location 960 of the playhead, the picture generator determines the number of reference pictures that are directly or indirectly referenced by each nearby picture in the group. Different embodiments provide different methods to compute the number of reference pictures for a video picture. In some embodiments, the picture generator performs operations 840 through 845 of the process 800 to determine the number of reference pictures for each video picture. Specifically, the picture generator first identifies a closest intra-picture in a decode order from which a decoder can start decoding in order to decode the particular picture (i.e., the farthest intra-picture in the decode order that is directly or indirectly referenced by the particular picture). The picture generator then counts from the particular picture to the identified intra-picture in the decode order, the number of reference pictures that are directly or indirectly referenced by the particular picture.

The fourth stage 920 of this figure shows the decode order of Pictures 12 to 18. In this decode order, the I-Picture 12 comes first as Picture 12 is an intra-picture that does not reference any other picture and is prior to the other pictures in the display order. Next in the order is Picture 15, which even though is after Pictures 13 and 14 in the display order, is needed for the decoding of Pictures 13 and 14 (as well as several other pictures). Picture 15 is followed by Pictures 13 and 14 which are B-pictures that directly reference both Pictures 12 and 15, and are before Pictures 16, 17, and 18 in the display order. Pictures 13 and 14 are followed by Picture 18, which even though is after Pictures 16 and 17 in the display order, is needed for the decoding of Pictures 16 and 17. Picture 18 also indirectly references (i.e., indirectly depends on the decoding of) Picture 12 through its direct reference to Picture 15. Picture 18 is followed by Pictures 16 and 17, which directly reference Pictures 15 and 18, and indirectly reference Picture 12.

In this example, the closest preceding intra-picture in the decode order from which a decoder can start decoding in order to decode Picture 17 is Picture 12. Therefore, from Picture 17 to Picture 12 in the decode order, the picture generator counts the number of pictures that are directly or indirectly referenced by Picture 17. Pictures 12, 15, and 18 are directly or indirectly referenced by Picture 17. Thus, the picture generator determines that Picture 17 has a count of three reference pictures. In other words, a decoder is required to decode three other pictures in order to decode Picture 15. As previously mentioned, in counting the number of reference pictures that are directly or indirectly referred to by a particular picture, the picture generator of some embodiments does not count any reference picture that it has previously counted in a direct or indirect reference of the particular picture. Thus, for Picture 17, the picture generator counts Picture 15 only once, even though Picture 17 directly references Picture 15 and indirectly references it through Picture 18.

Using the same method, the picture generator determines that Picture 16 has a count of three reference pictures, Picture 15 has a count of only one reference picture, and Picture 14 has a count of two reference pictures. Therefore, the picture generator selects Picture 15 (as indicated by the thickened border) for display in the preview display area as Picture 15 has the smallest number of counted reference pictures within the group.

III. Media-Editing Application: User Interface

Figure 10:
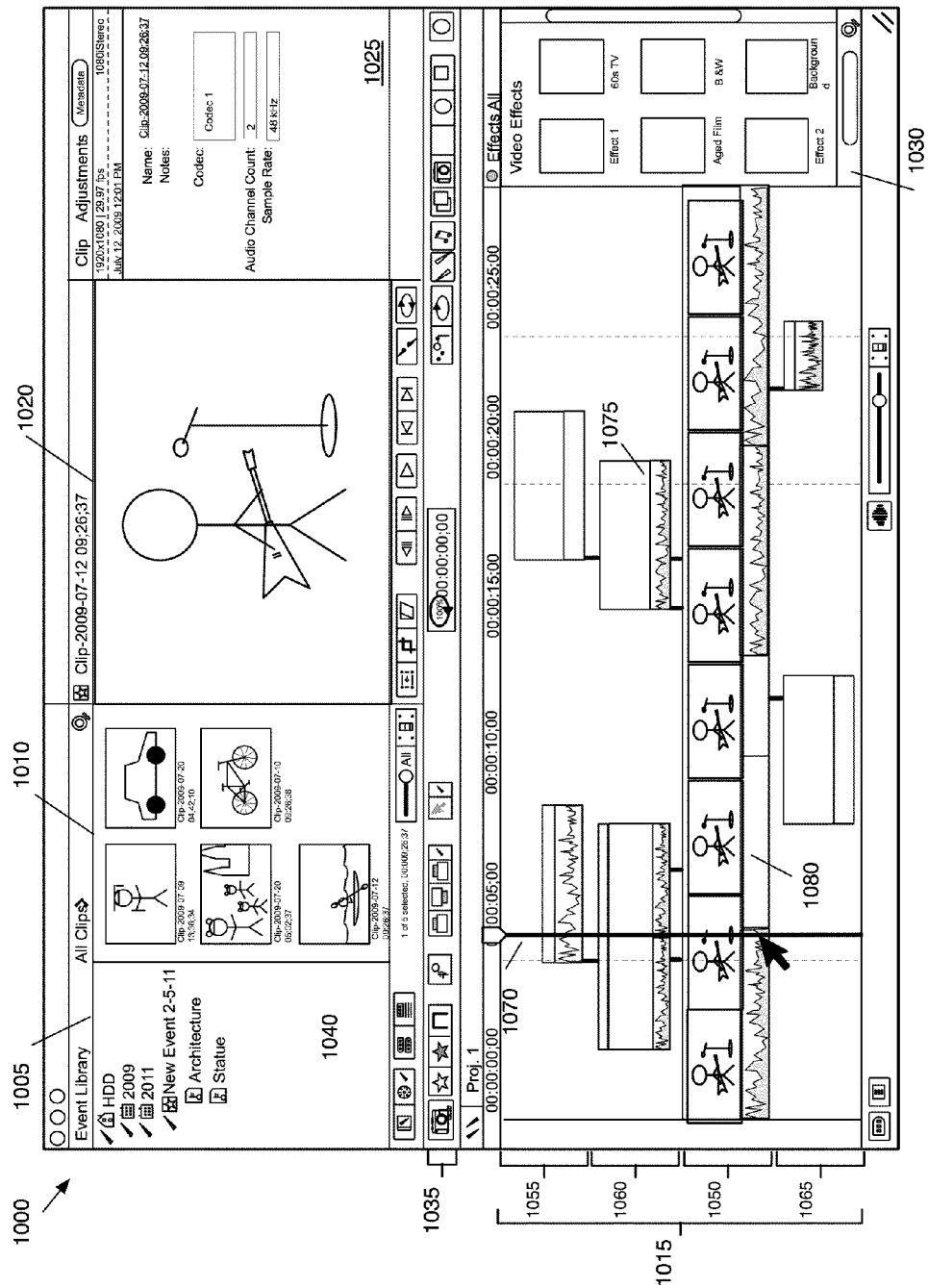
FIG. 10 illustrates a graphical user interface (GUI) of a media-editing application of some embodiments.

FIG. 10 illustrates a graphical user interface (GUI) 1000 of a media-editing application of some embodiments. This application uses the above-described preview generator of some embodiments to quickly generate preview displays as a playhead scrolls across a composite presentation in the timeline. The GUI 1000 includes a clip library 1005, a clip browser 1010, a timeline (also known as the composite display area) 1015, a preview display area 1020, an inspector display area 1025, an additional media display area 1030, a toolbar 1035, and a first playhead 1070.

The clip library 1005 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 1005 includes media clips from both 2009 and 2011.

Within a storage device and/or date, users or the application may group the media clips into "events", or organized folders of media clips. For instance, a user might give the events descriptive names that indicate what media is stored in the event (e.g., the "New Event Feb. 5, 2011" event shown in clip library 1005 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event Feb. 5, 2011" event, all media clips showing children might be tagged by the user with a "kids" keyword, and then these particular media clips could be displayed in a sub-folder of the event that filters clips in this event to only display media clips tagged with the "kids" keyword.

The clip browser 1010 allows the user to view clips from a selected folder (e.g., an event, a sub-folder, etc.) of the clip library 1005. As shown in this example, the folder "New Event Feb. 5, 2011" is selected in the clip library 1005, and the clips belonging to that folder are displayed in the clip browser 1010. Some embodiments display the clips as thumbnail filmstrips, as shown in this example. When a user moves a playhead (not shown) (by moving a cursor or a contact (e.g., finger) on a touchscreen) over one of the filmstrips (e.g., with a mouse, a touchpad, a touchscreen, etc.), the user can skim through the clip. That is, when the user places the playhead at a particular location within the thumbnail filmstrip, the media-editing application associates that location with a time in the associated media file, and displays the image from the media file for that time in the preview display area 1020. The media-editing application of some embodiments performs the picture selection operation using a preview generator as described above by reference to FIGS. 2 and 8 when the user is skimming through a clip. In addition, the user can command the application to play back the media file in the thumbnail filmstrip. Skimming through a clip displayed in a clip browser of some embodiments will be described in detail further below by reference to FIG. 12.

In addition, the thumbnails for the clips in the browser display an audio waveform underneath the clip that represents the audio of the media file. In some embodiments, as a user skims through or plays back the thumbnail filmstrip, the audio plays as well. There are several types of clips. An audio and video clip is a clip that contains both audio and video content. An audio clip is a clip that contains only audio content. A video clip is a clip that contains only video content.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 1015 provides a visual representation of a composite presentation (or project) being created by the user of the media-editing application. Specifically, it displays one or more geometric shapes that represent one or more media clips that are part of the composite presentation. The timeline 1015 of some embodiments includes a primary lane (also called a "spine", "primary compositing lane", or "central compositing lane") as well as one or more secondary lanes (also called "anchor lanes") above and/or below the primary lane. The spine represents a primary sequence of media, which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

Clips placed in the anchor lanes are referred to as "anchored clips." As an example, FIG. 10 shows a media clip 1075 that is anchored off of another media clip 1080 in the timeline 1015. In some of these embodiments, media clips can be placed in these anchor lanes to anchor off of media clips in the central compositing lane 1050. Instead of, or in conjunction with, having several levels of media clips that anchor off the central compositing lane 1050, some embodiments allow media clips to be placed in these anchor lanes and to be anchored off of other anchored media clips placed in these anchor lanes. To help the user distinguish the central compositing lane 1050 and the anchored lanes in the timeline 1015, some embodiments use different tones for these lanes. For instance, the timeline 1015 uses a darker tone for the central compositing lane 1050 than the tone for the anchored lanes 1055, 1060, and 1065.

As shown, the timeline 1015 can place different types of media clips in the same lane (a central compositing lane or an anchored lane). Also, the timeline 1015 can place different types of media clips in the anchor lanes above and below the central compositing lane. In other words, the timeline 1015 can place a media clip of any type (e.g., audio clip, video clip, audio and video clip, etc.) in any lane of the timeline 1015.

Also, when there are multiple anchored clips at a position along the timeline 1015, the media content of an anchored clip in an upper anchor lane takes the priority over the media content of a media clip in a lower lane in some embodiments. For instance, the video content of the media clip in the uppermost anchor lane will be the content of the presentation for the period time along the timeline that the media clip spans.

As with the clips in the clip browser, the user can skim through the timeline or play back the timeline (either a portion of the timeline or the entire timeline) by moving the playhead 1070 across a video clip icon (e.g., the video clip icon 1080). Although not shown in FIG. 10, the GUI also includes a second playhead that can be used to skim through the composite presentation that is in the timeline. As further described below, the application dynamically displays this second playhead whenever the application detects that the cursor or touch screen contact is over the timeline, and moves this playhead as the cursor or touch-screen contact is moved across the timeline. In some embodiments, as a playhead moves across a timeline over a video clip, the preview generator performs the picture selection operation as described above by reference to FIGS. 2 and 8 and provides a preview display of the video content.

The preview display area 1020 (also referred to as a "viewer") displays images from media files that the user is skimming through, playing back, or editing. These images may be from a composite presentation in the timeline 1015 or from a media clip in the clip browser 1010. In this example, the user has been skimming through the beginning of clip 1040, and therefore an image from the start of this media file is displayed in the preview display area 1020. As shown, some embodiments will display the images as large as possible within the display area while maintaining the aspect ratio of the image.

The inspector display area 1025 displays detailed properties about a selected item and allows a user to modify some or all of these properties. The selected item might be a clip, a composite presentation, an effect, etc. In this case, the clip that is shown in the preview display area 1020 is also selected, and thus the inspector displays information about media clip 1040. This information includes duration, file format, file location, frame rate, date created, audio information, etc. about the selected media clip. In some embodiments, different information is displayed depending on the type of item selected.

The additional media display area 1030 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 1030 is currently displaying a set of effects for the user to apply to a clip. In this example, only two effects are shown in the display area (the keyer effect and the luma keyer effect, because the user has typed the word "keyer" into a search box for the effects display area).

The toolbar 1035 includes various selectable items for editing, modifying what is displayed in one or more display areas, etc. The right side of the toolbar includes various selectable items for modifying what type of media is displayed in the additional media display area 1030. The illustrated toolbar 1035 includes items for video effects, visual transitions between media clips, photos, titles, generators and backgrounds, etc. In addition, the toolbar 1035 includes an inspector selectable item that causes the display of the inspector display area 1025 as well as items for applying a retiming operation to a portion of the timeline, adjusting color, trimming, anchoring, creating position clips, and other functions.

The left side of the toolbar 1035 includes selectable items for media management and editing. Selectable items are provided for adding clips from the clip browser 1010 to the timeline 1015. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One of ordinary skill in the art will also recognize that the set of display areas shown in the GUI 1000 is one of many possible configurations for the GUI of some embodiments. For instance, in some embodiments, the presence or absence of many of the display areas can be toggled through the GUI (e.g., the inspector display area 1025, additional media display area 1030, and clip library 1005). In addition, some embodiments allow the user to modify the size of the various display areas within the UI. For instance, when the display area 1030 is removed, the timeline 1015 can increase in size to include that area. Similarly, the preview display area 1020 increases in size when the inspector display area 1025 is removed. Moreover, one of ordinary skill in the art will recognize that the graphical user interface 1000 is only one of many possible GUIs for such a media-editing application.

Additional features and functionalities of a media-editing application of some embodiments are described further in U.S. patent application Ser. No. 13/151,175, now published as US2012/021030, entitled "Media-Editing Application with Anchored Timeline," filed Jun. 1, 2011. The U.S. patent application Ser. No. 13/151,175 is incorporated herein by reference.

Figure 11:
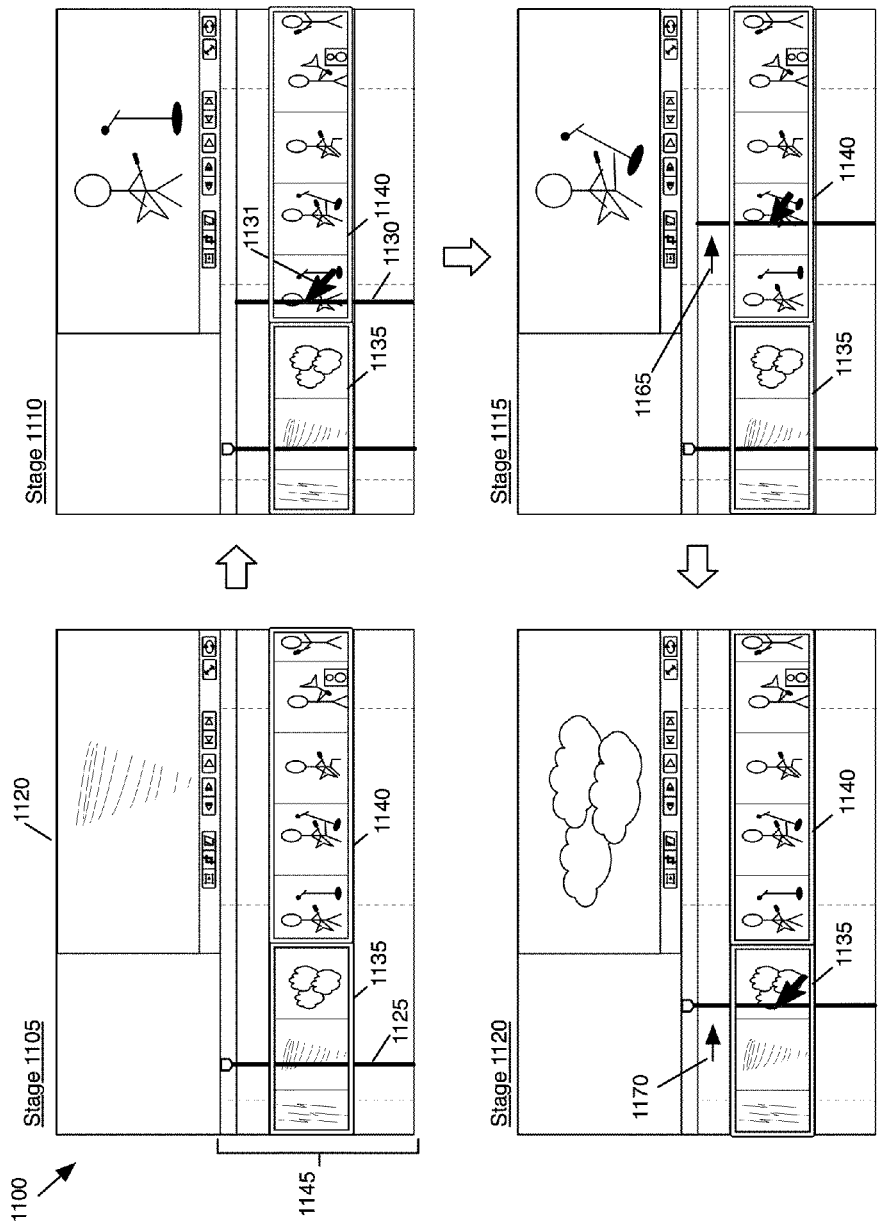
FIG. 11 illustrates a timeline of a media-editing application having two skimming tools.

FIG. 11 illustrates a preview-generation function of the media-editing application of FIG. 10. In FIG. 11, a simplified version of the GUI 1000 is shown in order not to obscure the description of this figure with unnecessary detail. The GUI 1100 of the media-editing application of FIG. 11 has two skimming tools (e.g., playheads) that can each initiate a preview generation function whenever they move.

As shown, the GUI 1100 includes a timeline 1145 and a viewer 1120. The timeline 1145 and the viewer 1120 are similar to the timeline 1015 and the viewer 1020 described above by reference to FIG. 10. The timeline 1145 of some embodiments provides two playheads, a skimming playhead 1130 and a primary playhead 1125. In some embodiments, the skimming playhead 1130 is a playhead that matches a selected position in the timeline 1145 (the selection is made by, e.g., placing a cursor in the timeline or touching the area of the timeline on a touch screen display). That is, the media-editing application of some embodiments detects a cursor or touch-screen contact entering the timeline, dynamically produces a skimming playhead (i.e., makes the skimming playhead appear) at the location of the cursor/contact, and moves the skimming playhead with the movement of the cursor/contact. The media-editing application removes the skimming playhead (i.e., makes the skimming playhead disappear) from the timeline when the application detects a cursor or touch-screen contact has departed the timeline. On the contrary, the primary playhead 1125 is a static (as opposed to dynamically produced/removed) playhead that scrolls across the timeline 1145 during playback or can be selected and moved across the timeline by the user of the media-editing application. The primary playhead specifies a current editing position in the timeline 1145, while the skimming playhead specifies a skimming position in the timeline 1145.

When the media-editing application produces the skimming playhead in the timeline, the skimming playhead becomes the editing position in some embodiments, since it is the point of focus. It will override the primary playhead 1125 when it is present in the timeline 1145. When the media-editing application removes the skimming playhead from the timeline (e.g., when the user has moved the cursor outside of the timeline 1145 to another portion of the GUI 1100, touched another portion of the GUI 1100 on a touch screen display, selected the primary playhead, etc.), the primary playhead 1125 becomes the current editing position. The primary playhead 1125 allows the user to leave the timeline without losing the video picture of interest. Also, in some embodiments, different colors are used to represent the different playheads. For instance, a red color is used for the skimming playhead 1130 and a gray color is used for the primary playhead 1125 in some such embodiments.

FIG. 11 illustrates four operational stages of the GUI 1100 that show examples of how the media-editing application performs the picture selection operation of the invention to select the picture to display in the preview display area with respect to the movement of either of its two playheads. The first stage 1105 illustrates a starting position of the primary playhead 1125 in the timeline 1145 at which this playhead intersects with the media clip 1135. In some embodiments, each point along the length of a media clip represents a video picture of the media clip. As shown, the media-editing application displays in the viewer 1120 a picture of the media clip 1135 represented by a point along the timeline 1145 at which the primary playhead 1125 is positioned currently.

In the second stage 1110, the skimming playhead 1130 appears when the skimming playhead 1130 is selected (e.g., by moving a cursor 1131 into the timeline 1145, touching within the timeline on a touchscreen). The skimming playhead 1130 is placed at a position of the timeline 1145 such that the playhead intersects with the video clip icon 1140. As shown, the media-editing application displays in the viewer 1120 a picture of the video clip 1140 represented by a point along the timeline 1145 at which the skimming playhead 1130 is positioned currently in some embodiments.

The third stage 1115 illustrates the GUI 1100 after the user has moved the skimming playhead 1130 forward on the video clip icon 1140 (e.g., by moving or dragging a cursor, moving the playhead on a touch screen, etc.), as indicated by the arrow 1165. As shown, the media-editing application displays a different picture of the video clip 1140. The media-editing application performs the picture selection operation using a preview generator as described above by reference to FIGS. 2 and 8 to select a picture from the video clip 1140 for display in the preview display area. For instance, the application selects a picture from a set of pictures between the position of the skimming playhead 1130 in the second stage 1110 and the position of the skimming playhead 1130 in the third stage 1115 as the skimming playhead 1130 is being moved forward.

The fourth stage 1120 shows the GUI 1100 after the user has deselected the skimming playhead and moved the primary playhead forward on the video clip icon 1135, as indicated by the arrow 1170. As shown, the media-editing application displays a different picture from the video clip 1135. The media-editing application performs the picture selection operation using a preview generator (e.g., as described above by reference to FIGS. 2 and 8) to select the picture that is displayed in the preview display area. For instance, the application selects a picture from a set of pictures between the position of the primary playhead 1125 in the third stage 1115 and the position of the primary playhead 1125 in the fourth stage 1120 as the primary playhead 1125 is being moved forward.

Figure 12:
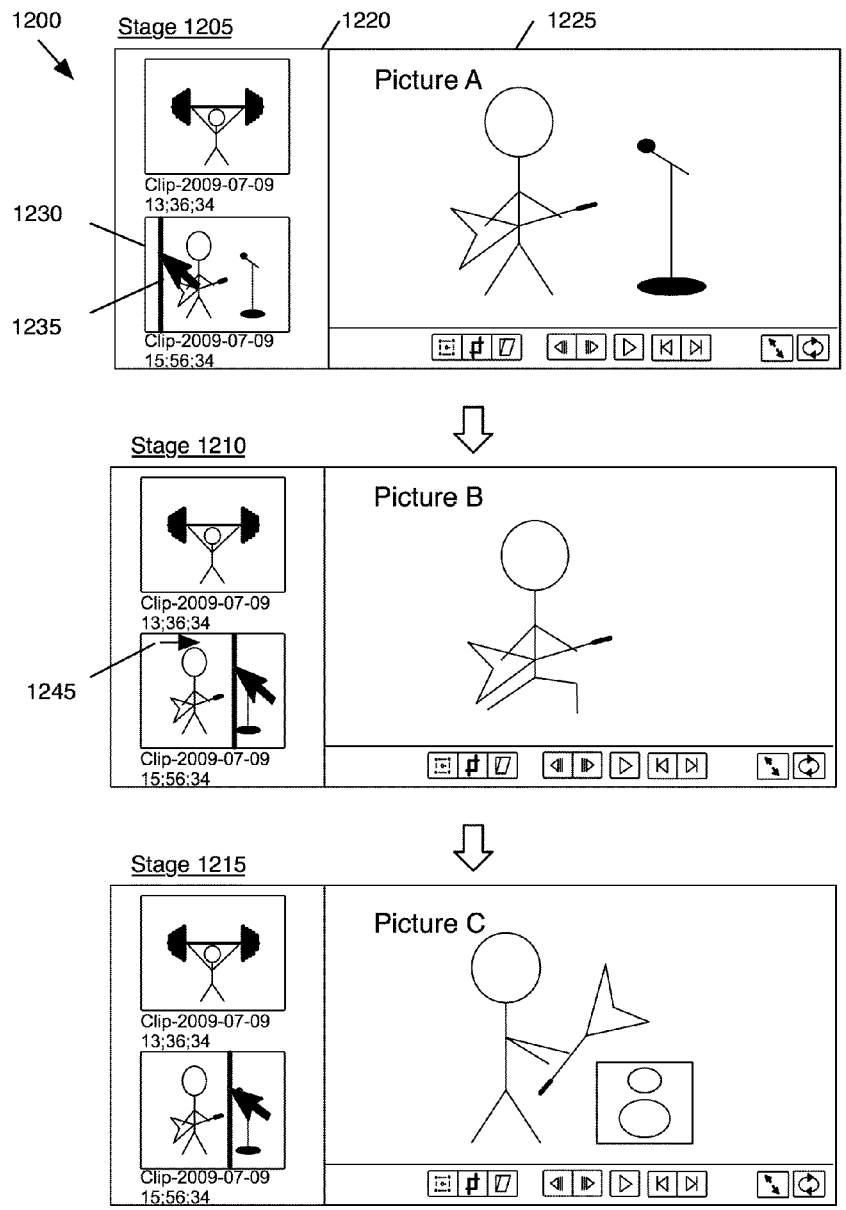
FIG. 12 illustrates an example of generating a video preview when a user skims through a thumbnail of a video in a media-editing application.

The examples above illustrated the preview generator of some embodiments that performs the picture selection operation when a user skims through a video clip icon. FIG. 12 illustrates that in some embodiments, the application's preview generator can also perform the picture selection operation when a user skims through a video clip thumbnail that represents the video clip in the media browser window of the media-editing application. Specifically, this figure illustrates the GUI 1200 at three different stages 1205, 1210, and 1215 that show how the skimming tool can be used to provide a preview of a video clip in the media browser of the application in some embodiments.

As shown in FIG. 12, the GUI 1200 includes a clip browser 1220 and a preview display area 1225. The clip browser 1220 is similar to the clip browser 1010 of FIG. 10 that allows the user to view clips from a selected folder (e.g., an event, a sub-folder, etc.) of the clip library. As shown, the clip browser 1220 includes a thumbnail that represents a video clip. Some embodiments provide the user a skimming tool on the thumbnail 1230 for skimming through the video clip. In some embodiments, the preview display area 1225 displays a picture of the video clip based on a location along the thumbnail at which the skimming tool 1235 is positioned currently. Thus, as the skimming tool 1235 moves from locations to locations on the thumbnail, the media-editing application displays in the preview display area 1225 different pictures of the video clip represented by the different locations of the skimming tool 1235 on the thumbnail.

The operation of the GUI 1200 will now be described by reference to the state of this GUI during the three stages 1205, 1210, and 1215. The first stage 1205 illustrates the GUI 1200 after the user has initiated the skimming tool 1235 on the thumbnail 1230. Different embodiments allow the skimming tool 1235 to be initiated in different manners. For instance, in some embodiments, the media-editing application automatically produces the skimming tool 1235 upon detecting the entrance of a cursor or a touch-screen contact into the thumbnail. In other embodiments, the media-editing application produces the skimming tool 1235 upon detecting a click operation or a touch-screen contact performed on the thumbnail. That is, the media-editing application of these embodiments produces the skimming playhead upon receiving user's request to produce it. As shown, the skimming tool 1235 is at a location of thumbnail 1230 that corresponds to Picture A of video clip 1230 ("the current picture"). In some embodiments, the preview generator displays a picture that is represented by the position of the skimming tool 1235 on the thumbnail. As shown, the preview display area 1225 displays Picture A.

The second stage 1210 displays the GUI 1200 after the user has moved the skimming tool 1235 forward (i.e., to the right) on the thumbnail 1230, as indicated by the arrow 1245. In some embodiments, a user can select and move the skimming tool 1235 by manipulating a cursor (e.g., by moving or dragging a cursor) while in other embodiments, the user can do the same with touch based manipulation (e.g., moving the playhead on a touch screen, etc.). As shown, the playhead 1235 has moved to a new location that corresponds to encoded Picture C of video clip 1230 ("the current picture"). In some embodiments, the picture generator performs the picture selection operation as described above by reference to FIGS. 2 and 8 to select a picture for displaying. As shown, the picture generator has selected Picture B for display in the preview display area 1225. Picture B in this example falls within the range of positions that the skimming playhead has covered from stage 1205 to 1210 and is already decoded and stored in the cache, while Picture C is not.

In the third stage 1215, the skimming tool 1235 has stayed at the same location (i.e., the user has not moved the skimming tool forward or backward) on the thumbnail for a duration of time. As shown, the skimming tool 1235 is at the same location as in the second stage 1210, which corresponds to encoded Picture C of video clip 1230 ("the current picture"). As described above, when the skimming tool has stayed at a particular location for a certain duration of time (e.g., 30-60 milliseconds), the picture generator decodes the current picture (i.e., the video picture of the video clip identified by the skimming tool on the thumbnail) and presents the current picture in the preview display area 1225 in some embodiments. As shown, since the skimming tool 1235 has stayed at the same location for a sufficient duration of time, Picture C (i.e., the current picture) is selected, decoded, and displayed in the preview display area 1225.

IV. Media-Editing Application: Architecture

Figure 13:
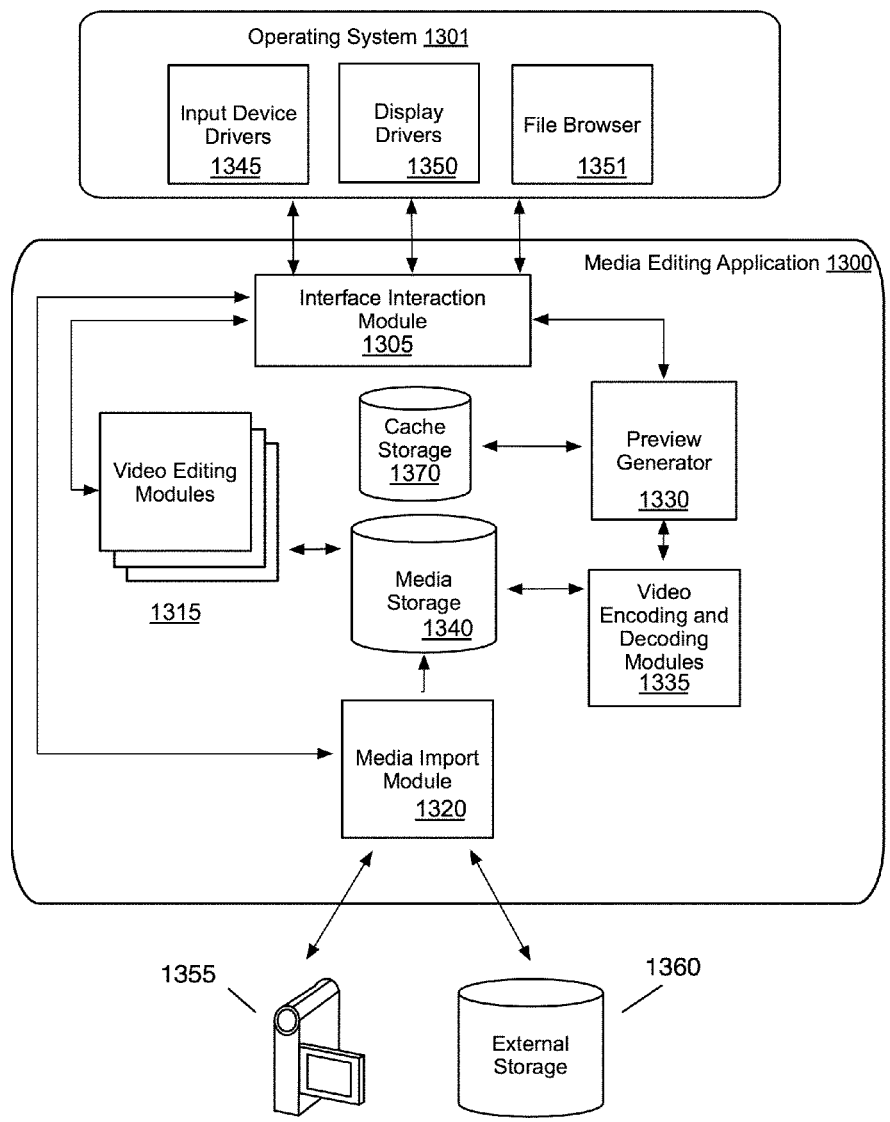
FIG. 13 conceptually illustrates the software architecture of a media-editing application of some embodiments.

In some embodiments, the processes described above are implemented as software running on a particular machine, such as a computer or a handheld device, or stored in a machine readable medium. FIG. 13 conceptually illustrates the software architecture of a media-editing application 1300 of some embodiments. Some examples of such media-editing application include iMovie® and Final Cut Pro®, both sold by Apple Inc.® In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

As shown, the media-editing application 1300 includes an interface interaction module 1305, a set of video editing modules 1315, a media import module 1320, a preview generator 1330, and a set of video encoding and decoding modules 1335. The application also includes a cache storage 1370 and a media storage 1340.

The interface interaction module 1305 of the media-editing application 1300 interprets the user input data received from the input device drivers 1345 and passes it to various modules, including the video editing modules 1315, the media import module 1320, and the preview generator 1330. In some embodiments, the input data directly affects the composite presentation data or other data stored in the media storage 1340.

The interface interaction module 1305 also manages the display of the user interface (UI), and outputs this display information to the display drivers 1350. This UI display information may be based on information from the various modules, including the video editing modules 1315, the media import module 1320, and the preview generator 1330.

The interface interaction module 1305 in some embodiments also relays another module's interface that relays input, associated with a skimming tool. For instance, the interface interaction module 1305 relays input from a file browser 1351 (also called as file-browsing window below) of an operating system 1301 to the preview generator 1330. The preview generator 1330 may return decoded pictures to the file browser 1351 through the interface interaction module 1305. More examples of interactions between a file browser and a preview generator of some embodiments are described below by reference to FIGS. 14 and 15.

The media import module 1320 imports media (e.g., a video) into the media-editing application for use in creating a composite presentation. Some embodiments, as shown, receive the media directly from a video capturing device such as a video camera 1355. Some embodiments import media from an external storage 1360. The external storage 1360 may be an SD card, a flash drive, an external hard drive, an internal hard drive in which the files are not stored in the organized file folder structure of the application, etc.

The preview generator 1330 in some embodiments is similar to the preview generator 500 described above by reference to FIG. 5, except that the preview generator 1330 does not include a decoder but instead uses one or more video decoding modules 1335 to decode an encoded picture. When the preview generator 1330 receives user input that affects that preview operation, the preview generator 1330 selects a picture from a video clip and provides a preview of the video clip according to the methods described above. In some embodiments, the preview generator 1330 selects a decoded picture stored in the cache storage 1370. In some embodiments, the preview generator 1330 selects an encoded picture, sends the encoded picture to the video decoding modules 1335 for decoding before displaying the picture through the user interface interaction module 1305. The decoding modules 1335 are similar to the decoder 525 described above by reference to FIGS. 5 and 6.

The video editing modules 1315 include a variety of modules for editing media in the clip browser as well as in the timeline. The editing modules 1315 handle the creation of projects, addition and subtraction of clips from projects, trimming or other editing processes within the timeline, application of effects and transitions, or other editing processes.

The media storage 1340 is a set of file folders organized by the media-editing application and stored on a particular set of storage devices. The storage devices may include the boot drive of the electronic device on which the application operates, a different partition of that disk, a separate internal or external hard drive, a flash drive, an SD card, etc.

The cache storage 1310 is similar to the storage 535 described above by reference to FIG. 5. That is, the cache storage 1310 is memory space allocated for the media application in a device's volatile memory (e.g., RAM) and/or its non-volatile memory (e.g., disk, flash memory, etc.) that stores decoded version of the video pictures that the preview generator 1330 has decoded in providing a preview of the video. The amount of memory allocated to the cache storage for storing the decoded video pictures is often finite, which in some embodiments requires purging of decoded pictures from the allocated memory whenever the application usage of this memory reaches its limits.

FIG. 13 also illustrates the operating system 1301 that includes input device driver(s) 1345, display drivers 1350, and the file browser 1351. In some embodiments, as illustrated, the input device drivers 1345 and display drivers 1350 are part of the operating system even when the media-editing application 1300 is an application separate from the operating system.

The input device drivers 1345 may include drivers for translating signals from a keyboard, mouse, touchpad, drawing tablet, touchscreen, etc. A user interacts with one or more of these input devices, which send signals to their corresponding device drivers. The device drivers then translate the signals into user input data that is provided to the UI interface interaction module 1305.

The display drivers 1350 receives signals (e.g., from the interface interaction module 1305) describing what should be displayed and translates these signals into pixel information that is sent to the display device. The display device may be an LCD, plasma screen, CRT monitor, touchscreen, etc.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

V. Alternative Embodiments

Figure 14:
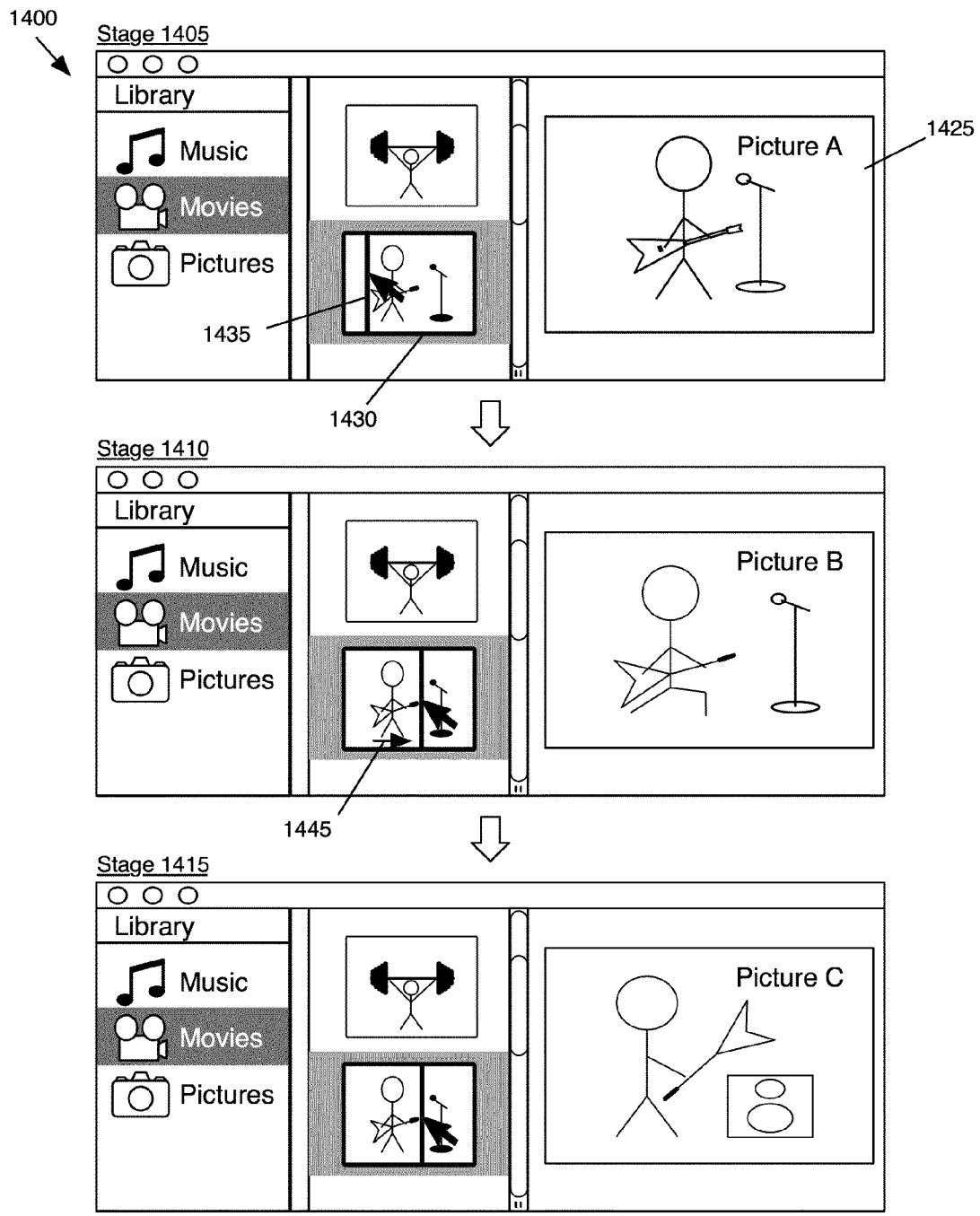
FIG. 14 illustrates an example of generating a video preview when a user skims through a thumbnail of a video in a file browser of an operating system.
Figure 15:
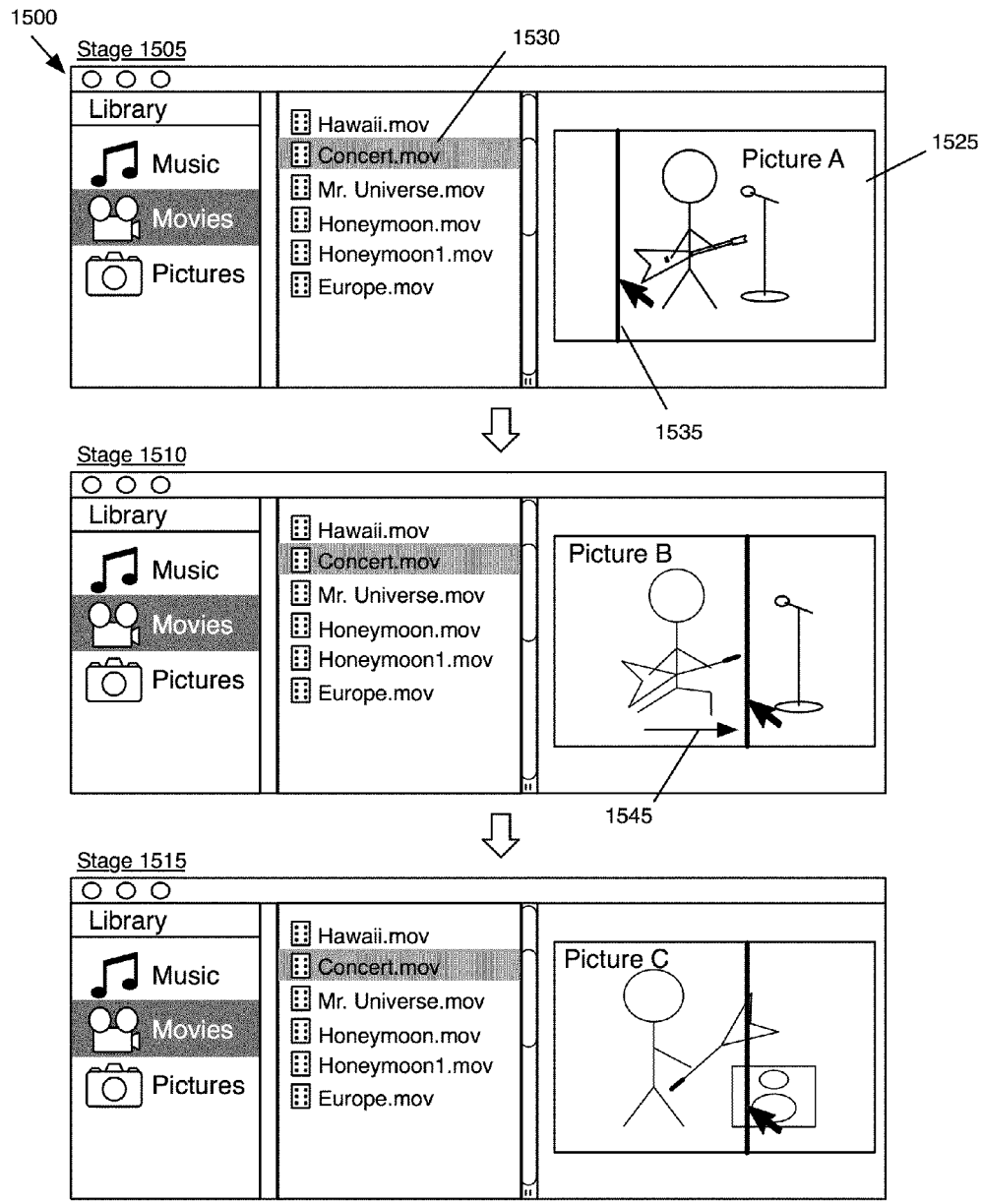
FIG. 15 illustrates an example of generating a video preview when a user skims through a video in a file browser of an operating system.

The examples described above have shown the preview generator of some embodiments performing the picture selection operation in a media-editing application. However, the preview generator of some embodiments can be used by any other application that executes on a device in order to generate quick previews of video clips stored on the device. One such application is the operating system of the device. FIGS. 14 and 15 provides several examples of an operating system of a device that uses the preview generator of some embodiments to generate previews of video clips.

FIG. 14 illustrates a GUI 1400 of a file-browsing window of an operating system (OS). The file browser in this example provides a column view of a hierarchical filing structure of the operating system. Even though this example is described by reference to a column view of a file-browsing window of the operating system, one of ordinary skill in the art will recognize that the preview generator of some embodiments can be used by the operating system to provide previews of video clips in any window of the operating system that is displayed in any view format.

As shown, the file browser 1400 includes three columns. The first column shows the "Music" folder, the "Movies" folder, and the "Pictures" folder. As shown, the "Movies" folder is selected. The second column shows thumbnails (e.g., thumbnail 1430) of videos in the "Movies" folder. The third column includes a preview display area 1425.

Some embodiments provide the user with a skimming tool on the thumbnail 1430 for skimming through a selected video clip. In some embodiments, the preview display area 1425 displays a picture of the video clip based on a location along the thumbnail at which the skimming tool 1435 is positioned currently. Thus, as the skimming tool 1435 moves between locations on the thumbnail (e.g., based on movement of a cursor or touch-screen contact), different pictures of the video clip represented by the different locations of the skimming tool 1435 on the thumbnail are displayed in the preview display area 1425.

Different embodiments provide the skimming tool differently. For instance, in some embodiments, the operating system automatically produces the skimming tool 1435 (i.e., make it appear) on the thumbnail 1430 when the operating system detects that a cursor or a touch-screen contact is over a thumbnail. Other embodiments produce the skimming tool 1435 when the user requests for the skimming tool (by, e.g., clicking or touching on a particular location within the thumbnail).

The operation of the GUI 1400 will now be described by reference to the state of this GUI during the three stages 1405, 1410, and 1415. The first stage 1405 illustrates the GUI 1400 after the skimming tool 1435 has been activated over the selected thumbnail 1430. The gray background of the thumbnail illustrates the selection of the thumbnail, while the appearance of the skimming tool 1435 indicates its activation. Different embodiments can select the thumbnail and activate the skimming tool differently. For instance, in some embodiments, the OS does these operations when the user performs a cursor click or touch-screen contact on the thumbnail 1430 and then clicks or touch-screen contacts again on a location within the thumbnail. In other embodiments, the OS does these operations when the user performs a single cursor click or touch-screen contact on a location on the thumbnail 1430. Yet other embodiments select the thumbnail and display the skimming tool when the cursor or touch-screen contact goes over the thumbnail.

In the first stage 1405, the skimming tool 1435 is at a location of thumbnail 1430 that corresponds to Picture A of video clip 1430 ("the current picture"). In some embodiments, the preview generator displays a picture that is represented by the position of the skimming tool 1435 on the thumbnail. As shown, the preview display area 1425 displays Picture A.

The second stage 1410 displays the GUI 1400 after the user has moved the skimming tool 1435 forward on the thumbnail 1430, as indicated by the arrow 1445. In some embodiments, a user can select and move the skimming tool 1435 by manipulating a cursor (e.g., by moving or dragging a cursor) while in other embodiments, the user can do the same with touch based manipulation (e.g., moving the playhead on a touch screen, etc.). As shown, the skimming tool 1435 has moved to a new location that corresponds to encoded Picture C of video clip 1430 ("the current picture"). In some embodiments, the picture generator performs the picture selection operation as described above to select a picture for displaying. As shown, the picture generator has selected Picture B for display in the preview display area 1425. As shown, the picture generator has selected Picture B for display in the preview display area 1425. Picture B in this example falls within the range of positions that the skimming tool 1435 has covered from stage 1405 to 1410 and is already decoded and stored in the cache, while Picture C is not.

In the third stage 1415, the skimming tool 1435 has stayed at the same location (i.e., the user has not moved the skimming tool forward or backward) on the thumbnail for a duration of time. As shown, the skimming tool 1435 is at the same location as in the second stage 1410, which corresponds to encoded Picture C of video clip 1430 ("the current picture"). In some embodiments, when the skimming tool has stayed at a particular location for a duration of time (e.g., 30-60 milliseconds), the picture generator decodes the current picture (i.e., the video picture of the video clip identified by the skimming tool on the thumbnail) and presents the current picture in the preview display area 1425. As shown, Picture C (i.e., the current picture) is selected and displayed in the preview display area 1425.

FIG. 15 illustrates another example of the preview generator being used by the operating system of a device. Specifically, FIG. 15 shows a file browser 1500 of an operating system that is configured to appear differently than the file browser 1400 described above by reference to FIG. 14. As shown, the file browser 1500 includes three columns. The first column shows the "Music" folder, the "Movies" folder, and the "Pictures" folder. As shown, the "Movies" folder is selected. The second column shows a list of videos in the "Movies" folder. The third column includes a preview display area 1525.

Some embodiments provide the user with a skimming tool on the preview display area 1525 for skimming through a video clip selected in the second column. In these embodiments, the preview display area 1525 displays a picture of the video clip based on a location along the preview display area 1525 at which the skimming tool 1535 is positioned currently. Thus, as the skimming tool 1535 moves between locations on the preview display area 1525, different pictures of the selected video clip represented by the different locations of the skimming tool 1535 on the preview display area 1525 are displayed in the preview display area 1525. The skimming tool is depicted as a vertical bar moving horizontally along the preview display area 1525 in this figure. However, one of the ordinary skill in the art will recognize that the skimming tool 1535 may have different appearances. For instance, the skimming tool 1535 may be a knob that the user can grab and move horizontally along a bar placed above or below or in the middle of the preview display area 1525 in order to control the playback of the selected video.

Different embodiments provide the skimming tool differently. For instance, in some embodiments, the operating system automatically produces the skimming tool 1535 (i.e., make it appear) on the preview display area 1525 when the operating system detects that a cursor or a touch-screen contact has entered the preview display area 1525. Other embodiments produce the skimming tool 1535 when the user requests for the skimming tool (by, e.g., clicking or touching on a particular location within the preview display area). Yet in other embodiments, the operating system places the skimming tool 1535 at a default location within the preview display area 1525 when the user selects a video clip in the second column (by, e.g., clicking the name of the video clip in the second column).

The operation of the GUI 1500 will now be described by reference to the state of this GUI during the three stages 1505, 1510, and 1515. The first stage 1505 illustrates the GUI 1500 after the selection of the video clip 1530 ("Concert.mov") and the activation of the skimming tool 1535 over the preview display area 1525. The gray background of the thumbnail illustrates the selection of the thumbnail, while the appearance of the skimming tool 1535 indicates its activation. Different embodiments can select the thumbnail and activate the skimming tool differently. For instance, in some embodiments, the OS does these operations when the user performs a cursor click or touch-screen contact on the thumbnail 1530 and then clicks or touch-screen contacts on a location on the preview display area 1525. In other embodiments, the OS does these operations when the thumbnail 1530 is selected (e.g., through a cursor click or touch-screen contact) and the cursor or touch-screen contact goes over the preview display area 1525.

In the first stage 1505, the skimming tool 1535 is at a location of the preview display area 1525 that corresponds to Picture A of video clip 1530 ("the current picture"). In some embodiments, the preview generator displays a picture that is represented by the position of the skimming tool 1535 on the preview display area 1525. As shown, the preview display area 1525 displays Picture A.

The second stage 1510 displays the GUI 1500 after the user has moved the skimming tool 1535 forward on the preview display area 1525, as indicated by the arrow 1545. In some embodiments, a user can select and move the skimming tool 1535 by manipulating a cursor (e.g., by moving or dragging a cursor) while in other embodiments, the user can do the same with touch based manipulation (e.g., moving the playhead on a touch screen, etc.). As shown, the skimming tool 1535 has moved to a new location that corresponds to encoded Picture C of video clip 1530 ("the current picture"). In some embodiments, the picture generator performs the picture selection operation as described above by reference to FIGS. 2 and 8 to select a picture for displaying. As shown, the picture generator has selected Picture B for display in the preview display area 1525. As shown, the picture generator has selected Picture B for display in the preview display area 1525. Picture B in this example falls within the range of positions that the skimming tool 1535 has covered from stage 1505 to 1510 and is already decoded and stored in the cache, while Picture C is not.

In the third stage 1515, the skimming tool 1535 has stayed at the same location (i.e., the user has not moved the skimming tool forward or backward) on the preview display area for a duration of time. As shown, the skimming tool 1535 is at the same location as in the second stage 1510, which corresponds to encoded Picture C of video clip 1530 ("the current picture"). In some embodiments, when the skimming tool has stayed at a particular location for a duration of time (e.g., 30-60 milliseconds), the picture generator decodes the current picture (i.e., the video picture of the video clip identified by the skimming tool on the preview display area) and presents the current picture in the preview display area 1525. As shown, Picture C (i.e., the current picture) is selected and displayed in the preview display area 1525.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
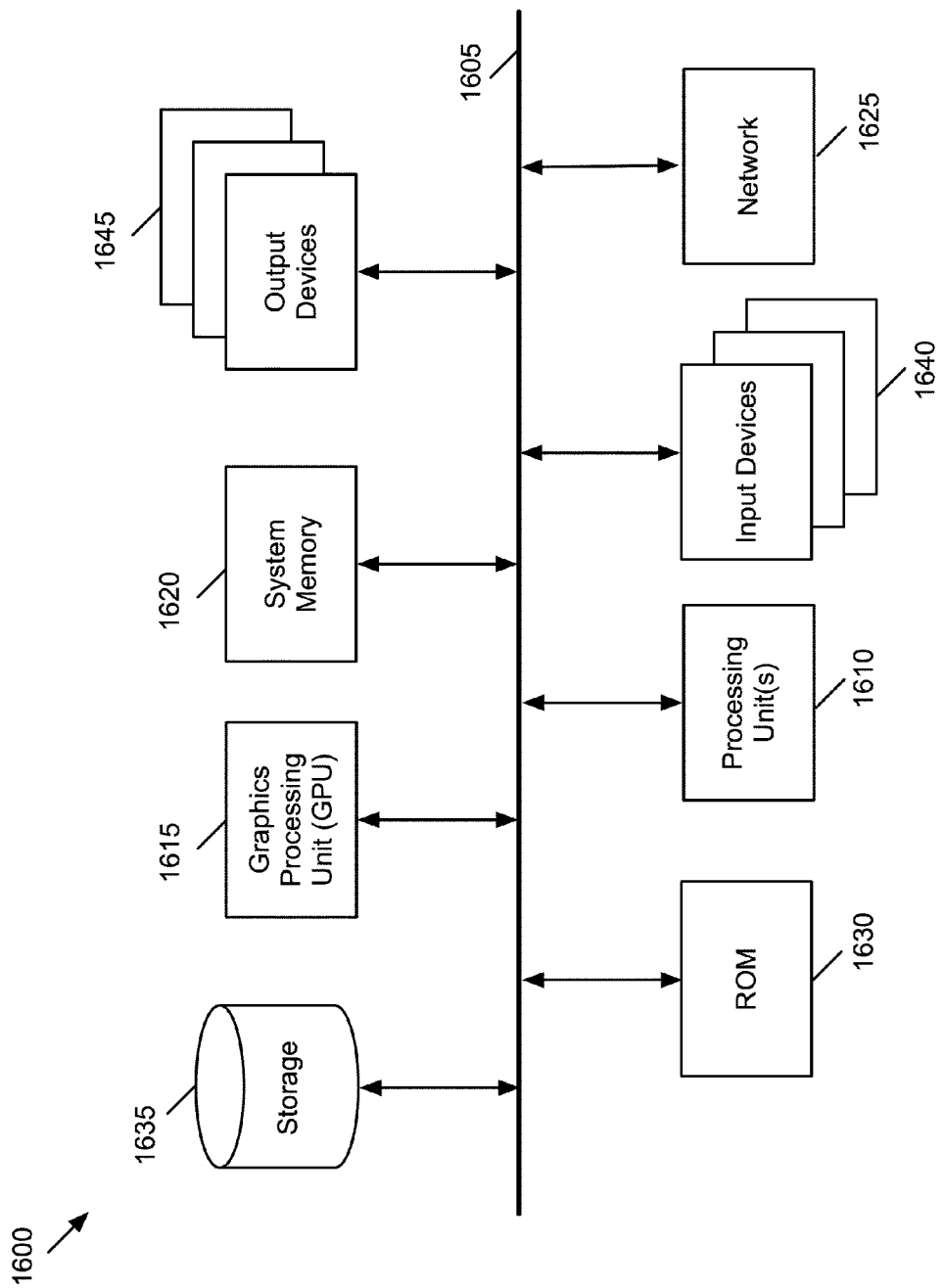
FIG. 16 conceptually illustrates an electronic system 1600 with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610. In some embodiments, such functionality can be provided using CoreImage's kernel shading language.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding disk drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for selecting a picture to display, the method comprising:
   identifying a current picture of a video corresponding to a location of a skimming tool that moves across a representation of the video, the video comprising a sequence of pictures, each picture corresponding to a different location in the representation;
   in a group of pictures associated with the current picture, determining that none of the pictures is currently decoded and that none of the pictures is an intra-encoded picture;
   selecting a picture, from the group of pictures, that is encoded by reference to a least number of pictures, the selected picture different from the current picture; and
   decoding and displaying the selected picture.

2. The method of claim 1, wherein the associated group of pictures includes pictures that are in a same encoding group of pictures.

3. The method of claim 1 further comprising displaying the current picture after the skimming tool has stayed at the location for a particular duration of time.

4. The method of claim 1, wherein the video is one of a plurality of media items in a composite media presentation generated by a media-editing application.

5. The method of claim 1, wherein the associated group of pictures includes pictures that are between a picture that corresponds to a last location of the skimming tool and the current picture.

6. The method of claim 1 further comprising, when more than one picture in the group have the least number of reference pictures, selecting a picture with the least number of reference pictures that is closest to the current picture.

7. A method of defining a video preview generator for providing preview of a video comprising a sequence of pictures, the method comprising:
   defining a movable skimming tool for identifying a current picture of the video corresponding to a location of the skimming tool on a representation of the video; and
   defining a picture identifier for:
   determining, in a group of pictures associated with the current picture identified by the skimming tool, that none of the pictures is currently decoded and that none of the pictures is an intra-encoded picture; and identifying a picture in the group of pictures, other than the current picture, that is encoded by reference to a fewest number of pictures;

defining a decoder for decoding the pictures identified by the picture identifier; and defining a display area for displaying the decoded picture.

8. The method of claim 7, wherein the associated group of pictures includes pictures that are in a same encoding group of pictures.

9. The method of claim 7, wherein the picture identifier is further for selecting the current picture when the skimming tool has stayed at the location for a particular duration of time.

10. The method of claim 7, wherein the video is one of a plurality of media items in a composite media presentation generated by a media-editing application.

11. The method of claim 7, wherein the associated group of pictures includes pictures that are between a picture that corresponds to a last location of the skimming tool and the current picture.

12. The method of claim 7, wherein identifying the picture that is encoded by reference to the fewest number of pictures comprises identifying a picture that is encoded by reference to the fewest number of pictures that is closest to the current picture when more than one picture in the group are encoded by reference to the fewest number of pictures.

13. A non-transitory machine readable medium storing a program for selecting a picture to display, the computer program executable by at least one processing unit, the program comprising sets of instructions for:

identifying a current picture of a video corresponding to a location of a skimming tool that moves across a representation of the video, the video comprising a sequence of pictures, each picture corresponding to a different location in the representation;

determining, in a group of pictures associated with the current picture, that none of the pictures is decoded;

determining whether an intra-encoded picture other than the current picture exists in the group of pictures;

selecting the intra-encoded picture when the intra-encoded picture exists in the group;

selecting a picture in the group of pictures, other than the current picture, that is encoded by reference to a fewest number of pictures when no intra-encoded picture exists in the group; and decoding and displaying the selected picture.

14. The non-transitory machine readable medium of claim 13, wherein the associated group of pictures includes pictures that are in a same encoding group of pictures.

15. The non-transitory machine readable medium of claim 13, the program further comprising a set of instructions for displaying the current picture after the skimming tool has stayed at the location for a particular duration of time.

16. The non-transitory machine readable medium of claim 13, wherein the video is one of a plurality of media items in a composite media presentation generated by a media-editing application.

17. The non-transitory machine medium of claim 16, wherein the associated group of pictures includes pictures that are between a picture that corresponds to a last location of the skimming tool and the current picture.

18. The non-transitory machine readable medium of claim 16, wherein the set of instructions for selecting the picture that is encoded by reference to a fewest number of pictures in the group comprises a set of instructions for selecting a picture that is encoded by reference to the fewest number of pictures that is closest to the current picture when more than one picture in the group are encoded by reference to the fewest number of pictures.

19. The non-transitory machine readable medium of claim 13, wherein the set of instructions for selecting the intra-encoded picture comprises a set of instructions for selecting an intra-encoded picture that is closest to the current picture when more than one intra-encoded pictures exist in the group of pictures.

* * * * *